United States Patent
Hirakata et al.

(10) Patent No.: US 8,102,480 B2
(45) Date of Patent: Jan. 24, 2012

(54) LIQUID CRYSTAL DISPLAY DEVICE

(75) Inventors: Yoshiharu Hirakata, Kanagawa (JP); Yuriko Hamamoto, Kanagawa (JP); Rumo Satake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 12/604,949

(22) Filed: Oct. 23, 2009

(65) Prior Publication Data
US 2010/0039574 A1 Feb. 18, 2010

Related U.S. Application Data

(60) Division of application No. 11/827,993, filed on Jul. 13, 2007, now Pat. No. 7,609,332, which is a division of application No. 10/774,834, filed on Feb. 9, 2004, now Pat. No. 7,248,320, which is a continuation of application No. 09/949,415, filed on Sep. 7, 2001, now Pat. No. 6,734,924.

(30) Foreign Application Priority Data

Sep. 8, 2000 (JP) .................................. 2000-273807

(51) Int. Cl.
*G02F 1/136* (2006.01)
*G02F 1/1335* (2006.01)
(52) U.S. Cl. ............................ 349/43; 349/113; 349/114
(58) Field of Classification Search .................... 349/43, 349/114, 113, 129
See application file for complete search history.

(56) References Cited

U.S. PATENT DOCUMENTS

| | | | |
|---|---|---|---|
| 5,585,951 A | 12/1996 | Noda et al. | |
| 5,644,370 A | 7/1997 | Miyawaki et al. | |
| 5,872,611 A | 2/1999 | Hirata et al. | |
| 5,926,235 A * | 7/1999 | Han et al. | 349/43 |
| 5,978,056 A | 11/1999 | Shintani et al. | |
| 6,091,466 A | 7/2000 | Kim et al. | |
| 6,100,954 A | 8/2000 | Kim et al. | |
| 6,130,729 A | 10/2000 | Oh et al. | |
| 6,181,398 B1 | 1/2001 | Libsch et al. | |
| 6,215,541 B1 | 4/2001 | Song et al. | |
| 6,262,783 B1 * | 7/2001 | Tsuda et al. | 349/39 |
| 6,278,504 B1 | 8/2001 | Sung | |

(Continued)

FOREIGN PATENT DOCUMENTS

EP 0 603 866 A1 6/1994

(Continued)

OTHER PUBLICATIONS

Ueda, T., "Improvement of Aperture Ratio by Shield Electrode Structure," Semiconductor World, '94 the Latest LCD Technology, extra edition, 1993, vol. 12, No. 13, issued on Oct. 15, 1993, pp. 136-138 (with full English translation, pp. 1-8).

*Primary Examiner* — James Dudek
(74) *Attorney, Agent, or Firm* — Husch Blackwell LLP

(57) ABSTRACT

Disclination of an active matrix liquid crystal display device is reduced. Portions of pixel electrodes are formed so as to mutually overlap with a convex portion. If the height of the convex portion is too tall, the amount of light leakage increases due to liquid crystals orienting diagonally with respect to a substrate surface. (See FIG. 1C.) If the height of the convex portion is low, the disclination reduction effect is low. The optimal convex portion height is thus determined.

24 Claims, 30 Drawing Sheets

U.S. PATENT DOCUMENTS

| | | |
|---|---|---|
| 6,310,670 B1 | 10/2001 | Lee |
| 6,346,718 B1 | 2/2002 | Yamanaka et al. |
| 6,356,318 B1 | 3/2002 | Kawahata |
| 6,380,561 B1 | 4/2002 | Ohtani et al. |
| 6,392,722 B1 | 5/2002 | Sekime et al. |
| 6,400,426 B1 | 6/2002 | Yamazaki et al. |
| 6,441,877 B1 | 8/2002 | Watanabe |
| 6,452,648 B2 | 9/2002 | Maeda |
| 6,515,720 B1 | 2/2003 | Iizuka et al. |
| 6,549,259 B2 | 4/2003 | Sato et al. |
| 6,552,758 B1 | 4/2003 | Koyama |
| 6,555,265 B1 | 4/2003 | Fleming et al. |
| 6,556,265 B1 | 4/2003 | Murade |
| 6,577,372 B2 | 6/2003 | Zhang et al. |
| 6,597,413 B2 | 7/2003 | Kurashina |
| 6,628,367 B2 | 9/2003 | Hirabayashi et al. |
| RE38,288 E | 10/2003 | Yamada et al. |
| 6,633,356 B1 | 10/2003 | Kataoka et al. |
| 6,661,488 B1 | 12/2003 | Takeda et al. |
| 6,670,635 B1 | 12/2003 | Yamazaki et al. |
| 6,683,592 B1 | 1/2004 | Murade |
| 6,683,668 B2 | 1/2004 | Moon et al. |
| 6,721,024 B1 | 4/2004 | Kishimoto et al. |
| 6,734,924 B2 | 5/2004 | Hirakata et al. |
| 6,801,267 B2 | 10/2004 | Satake |
| 6,897,929 B2 | 5/2005 | Takeda et al. |
| 6,900,869 B1 | 5/2005 | Lee et al. |
| 6,927,824 B1 | 8/2005 | Takeda et al. |
| 7,394,511 B2 | 7/2008 | Okamoto et al. |
| 2001/0002144 A1 | 5/2001 | Yamazaki |
| 2001/0035919 A1 | 11/2001 | Zhang |
| 2001/0048489 A1 | 12/2001 | Izumi et al. |
| 2002/0036818 A1 | 3/2002 | Kawata |
| 2002/0063841 A1 | 5/2002 | Hirakata et al. |
| 2002/0080312 A1 | 6/2002 | Yamaguchi et al. |
| 2002/0191124 A1 | 12/2002 | Nakata |
| 2003/0197179 A1 | 10/2003 | Yamazaki et al. |
| 2003/0210358 A1 | 11/2003 | Zhang et al. |
| 2004/0012725 A1 | 1/2004 | Tomioka et al. |
| 2004/0046915 A1 | 3/2004 | Takeda et al. |
| 2004/0051100 A1 | 3/2004 | Yamazaki et al. |
| 2004/0075782 A1 | 4/2004 | Ha et al. |
| 2005/0041167 A1 | 2/2005 | Sugimoto et al. |
| 2005/0237442 A1 | 10/2005 | Yamazaki et al. |
| 2006/0091387 A1 | 5/2006 | Yamazaki |
| 2008/0117375 A1 | 5/2008 | Satake |

FOREIGN PATENT DOCUMENTS

| | | |
|---|---|---|
| EP | 1 079 260 A2 | 2/2001 |
| JP | 63-292114 | 11/1988 |
| JP | 3-212621 | 9/1991 |
| JP | 7-20497 | 1/1995 |
| JP | 7-84284 | 3/1995 |
| JP | 8-78329 | 3/1996 |
| JP | 8-160454 | 6/1996 |
| JP | 2000-56319 | 2/2000 |
| JP | 2000-75297 | 3/2000 |
| JP | 2000-221532 | 8/2000 |
| JP | 2001-33800 | 2/2001 |
| JP | 2001-42332 | 2/2001 |
| JP | 2001-133749 | 5/2001 |
| JP | 2001-133750 | 5/2001 |
| JP | 2002-40455 | 2/2002 |

* cited by examiner

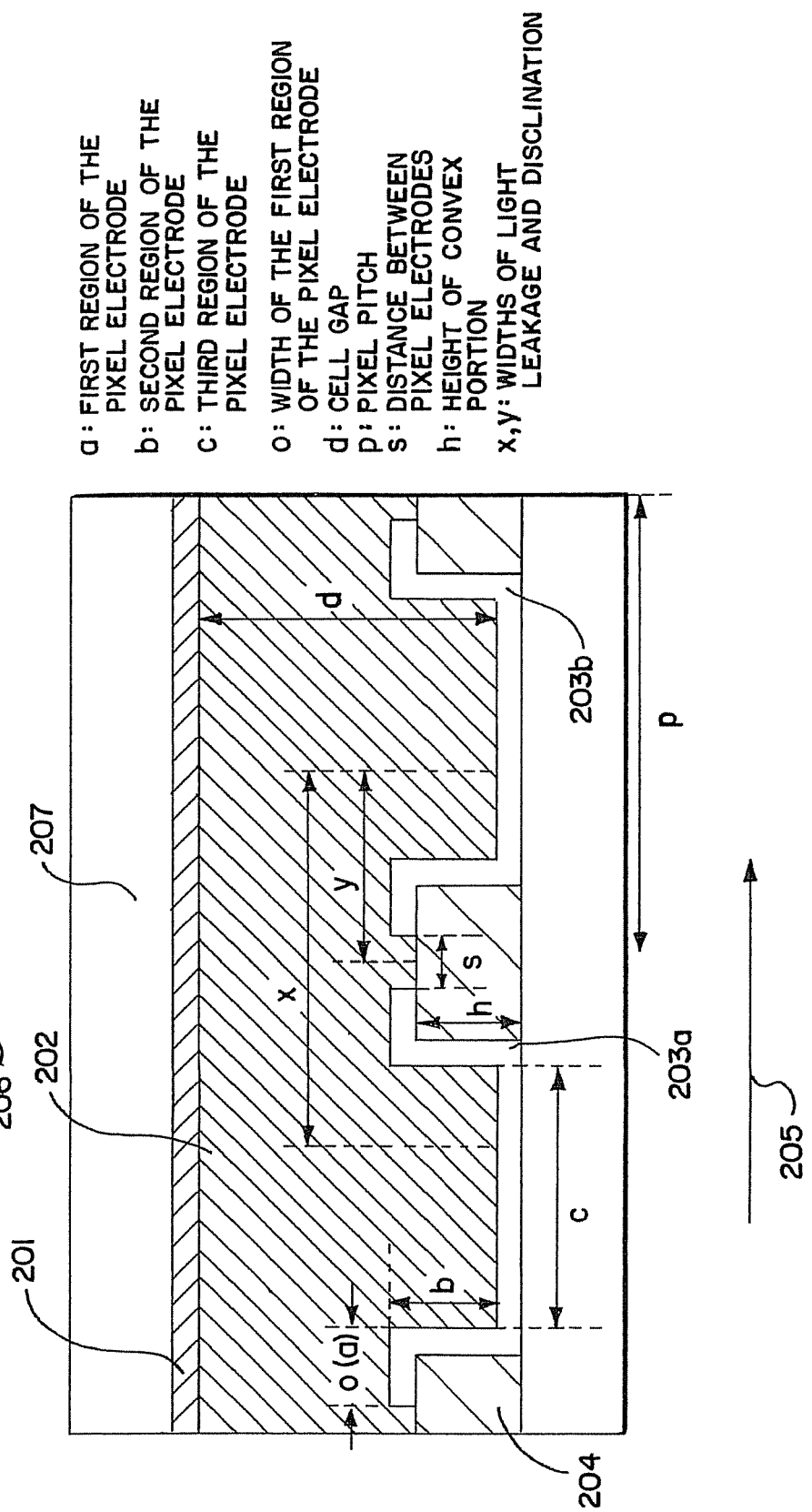

d: CELL GAP (μm)
S: DISTANCE BETWEEN PIXEL ELECTRODES (μm)
p: PIXEL PITCH (μm)

RELATIONSHIP BETWEEN WIDTHS OF LIGHT LEAKAGE AND DISCLINATION (x)
AND HEIGHT OF CONVEX PORTION (h)

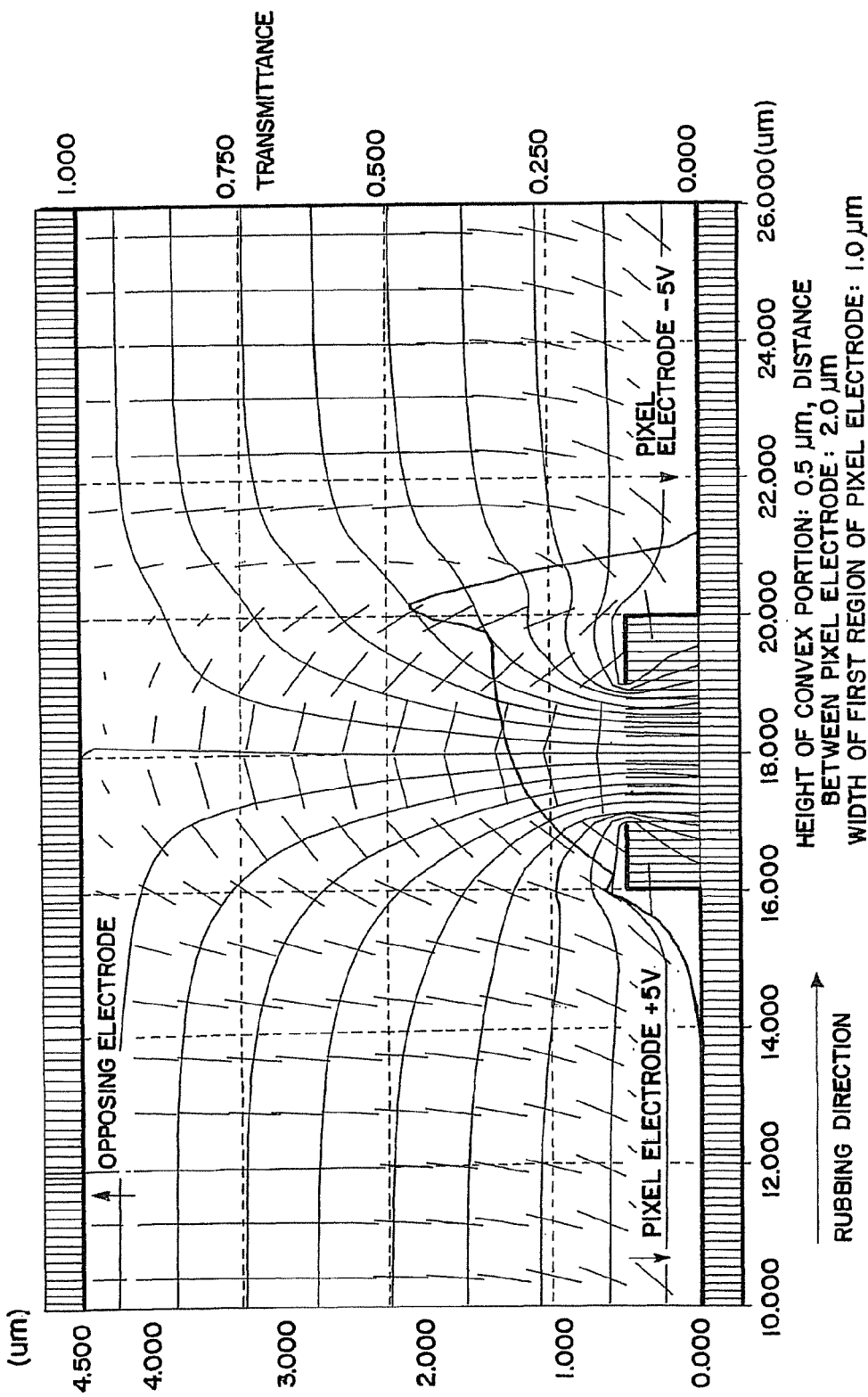

THE RELATION BETWEEN WIDTH OF FIRST REGION OF PIXEL ELECTRODE AND WIDTH OF DISCLINATION AND LIGHT LEAKAGE
DISTANCE BETWEEN PIXEL ELECTRODES: 2.0 μm (S=2), 4.0 μm (S=4)

THE RELATION BETWEEN WIDTH OF FIRST REGION OF PIXEL ELECTRODE AND WIDTH OF DISCLINATION AND LIGHT LEAKAGE
DISTANCE BETWEEN PIXEL ELECTRODES: 2.0 μm (S=2), 4.0 μm (S=4)

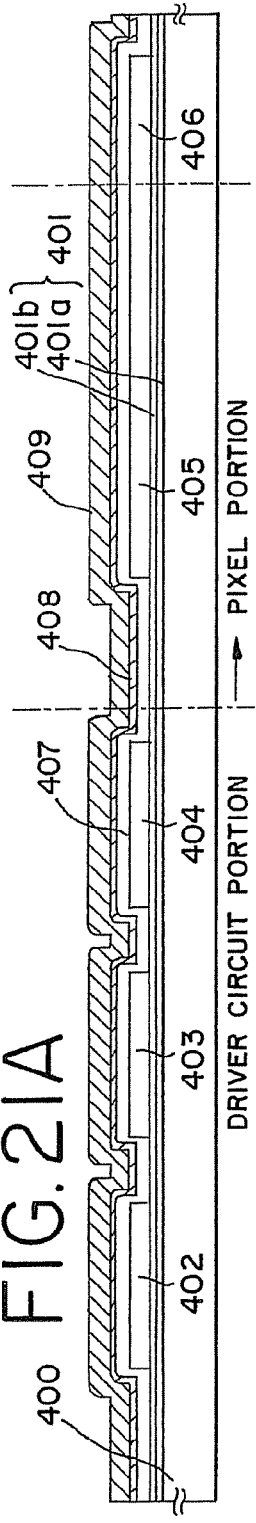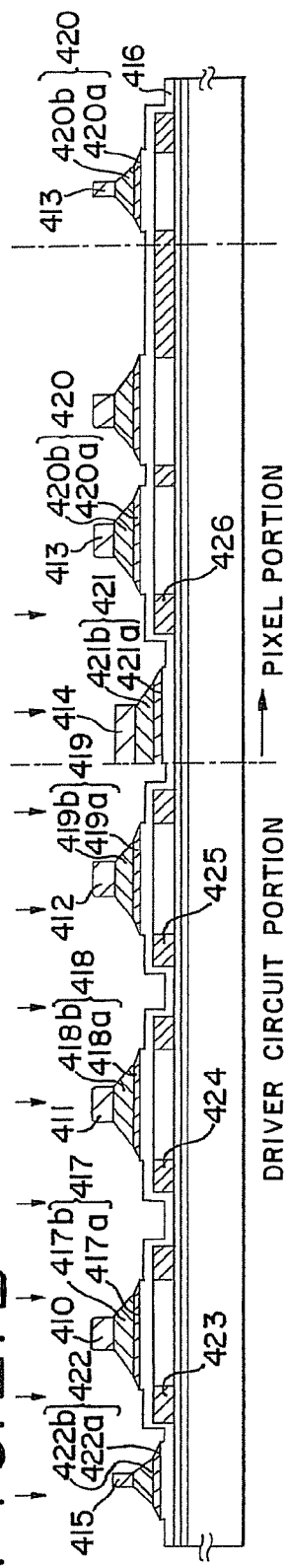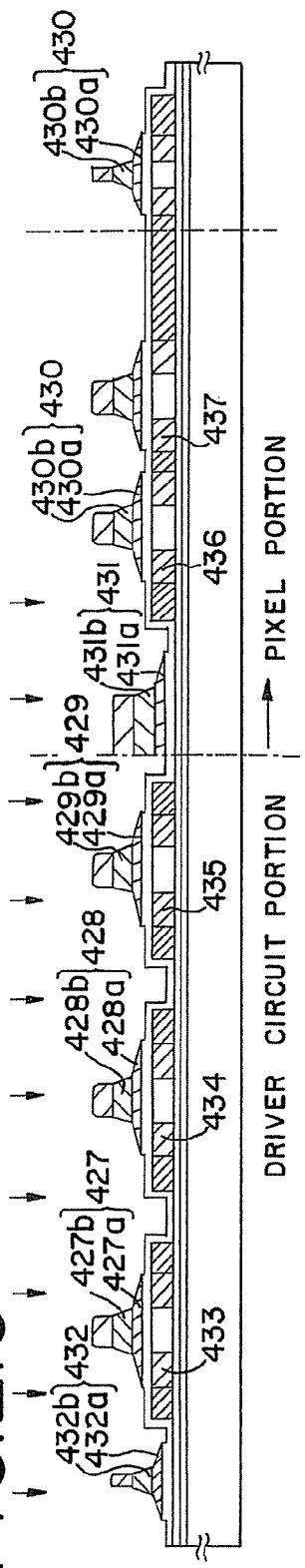

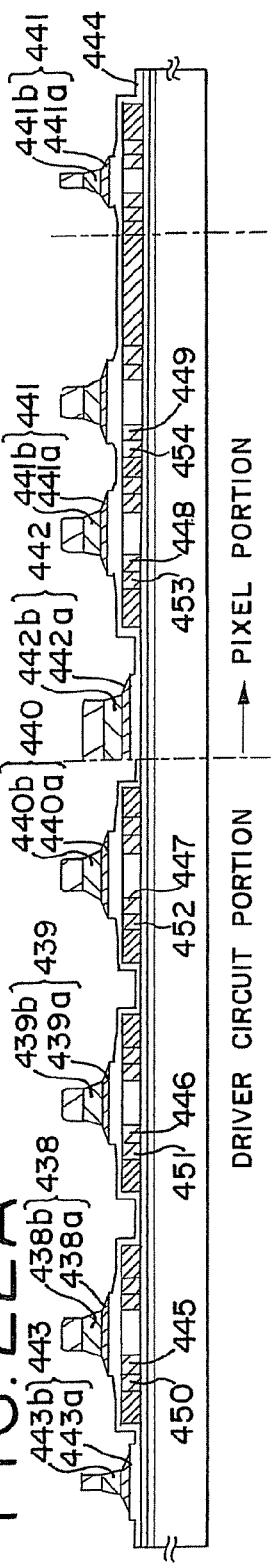
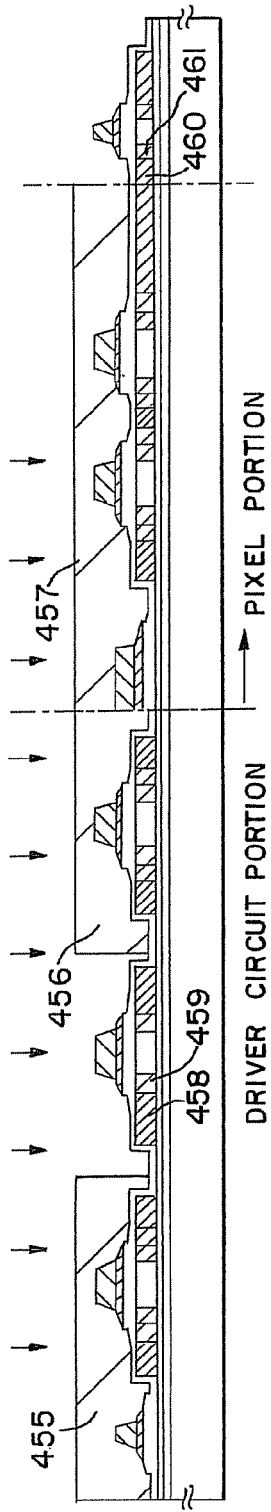
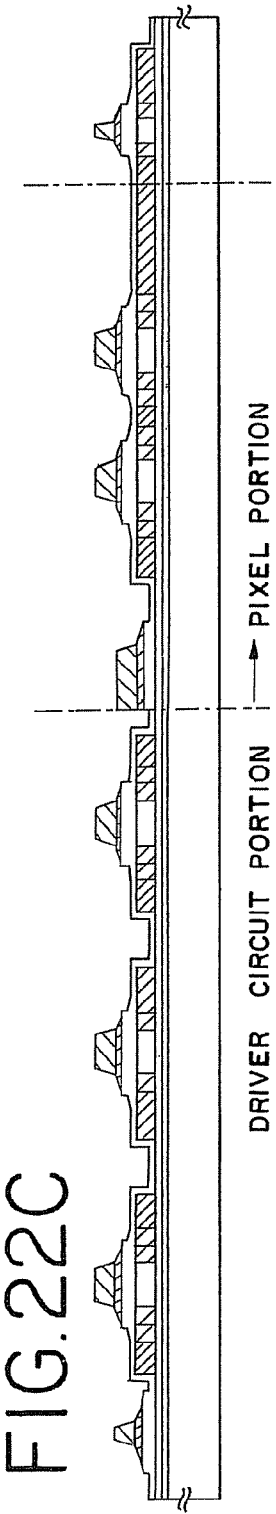

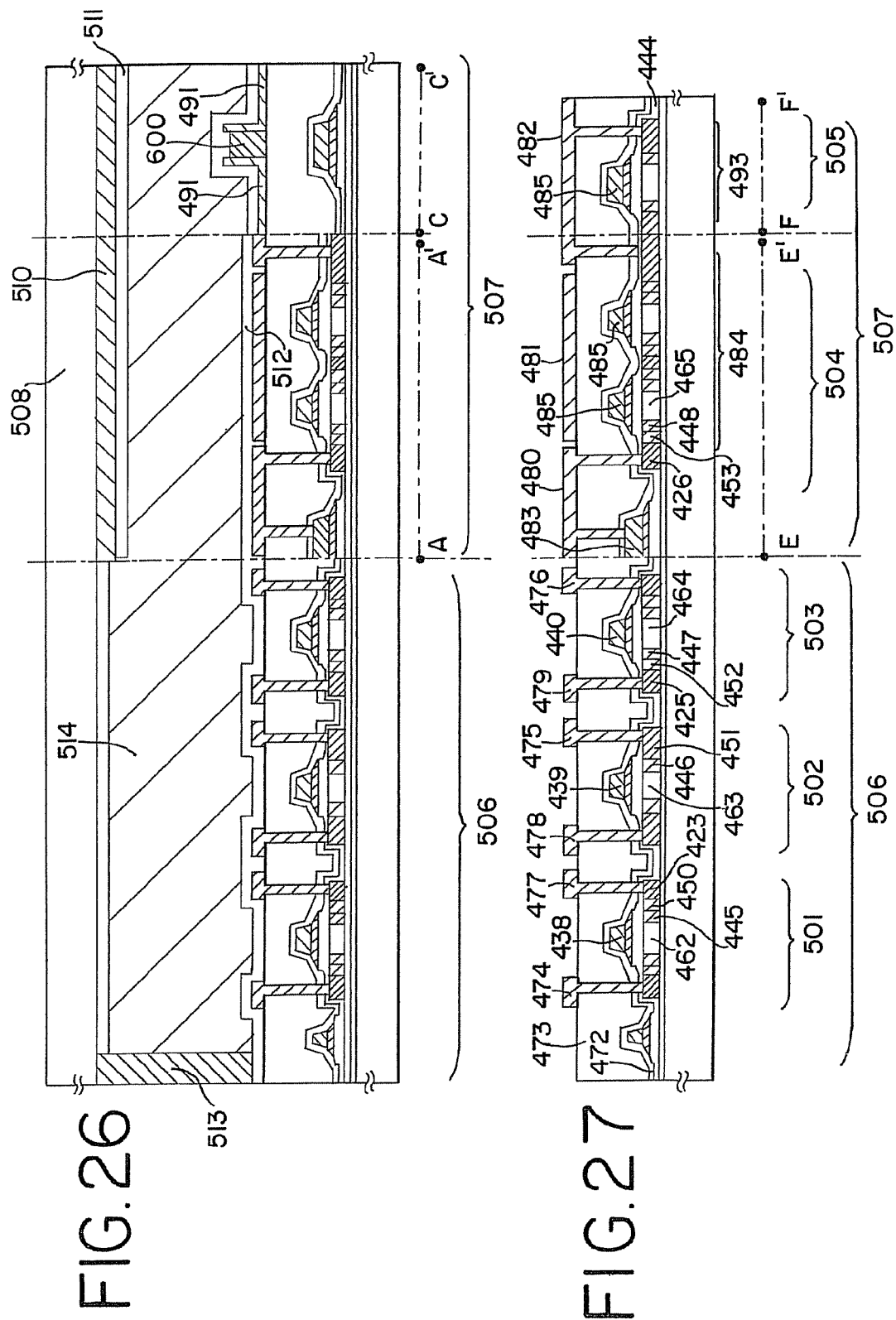

o = -1.0 μm o = 0 μm o = 0.5 μm o = 1.0 μm d: CELL GAP (μm)
s: DISTANCE BETWEEN PIXEL ELECTRODES (μm)
p: PIXEL PITCH (μm)

RELATIONSHIP BETWEEN WIDTHS OF LIGHT LEAKAGE AND DISCLINATION(x) AND HEIGHT OF CONVEX PORTION(h)

LIQUID CRYSTAL DISPLAY DEVICE

This application is a divisional of U.S. application Ser. No. 11/827,993, filed on Jul. 13, 2007 now U.S. Pat. No. 7,609,332 which is a divisional of U.S. application Ser. No. 10/774,834, filed on Feb. 9, 2004 (now U.S. Pat. No. 7,248,320 issued Jul. 24, 2007) which is a continuation of U.S. application Ser. No. 09/949,415, filed on Sept. 7, 2001 (now U.S. Pat. No. 6,734,924 issued May 11, 2004).

BACKGROUND OF THE INVENTION

1. Field of the Invention

The present invention relates to a semiconductor device having circuits structured by electric field effect transistors (FETs), for example, thin film transistors (TFTs), and to a method of manufacturing the semiconductor device. The present invention relates, for example, to a semiconductor device, typically a liquid crystal display panel, and to an electronic device in which such a semiconductor device is mounted as its component.

Note that, throughout this specification, the term electrooptical device indicates general devices for performing shading display by changing an electrical signal, and that liquid crystal display devices and display devices using electroluminescence (EL) are included in the category of electrooptical device.

Note also that, throughout this specification, the term element substrate indicates general substrates on which active elements such as TFTs and MIMs are formed.

2. Description of the Related Art

Techniques of structuring thin film transistors using semiconductor thin films (having thicknesses on the order of several nm to several hundred nm) formed on a substrate having an insulating surface have been focused upon in recent years. The thin film transistors are being widely applied to electronic devices Like ICs and semiconductor devices, and in particular, their development has accelerated rapidly as switching elements of liquid crystal display devices.

Liquid crystal display devices are known to be roughly divided into active matrix types and passive matrix types.

A high-grade image can be obtained with active matrix liquid crystal display devices using TFTs as switching elements. Active matrix applications are generally to notebook type personal computers, but they are also expected to be used in televisions for a home and in portable information terminals.

The active matrix liquid crystal display devices are generally driven by line inversion drive. With the line inversion drive, for example source line inversion drive, the polarity of voltages applied to adjacent source lines differs, as shown in FIGS. 37A and 37B, and the polarity of the voltage applied to each source line changes each frame. FIGS. 37A and 37B show the polarity of voltages applied to pixels during the source line inversion drive. Drive in which the polarity of the voltage differs for each adjacent source line is referred to as the source line inversion drive. Drive in which the polarity of the voltage differs for each adjacent gate line is referred to as gate line inversion drive.

FIG. 10 shows schematically a cross section of a pixel portion of a liquid crystal display device. An electric field formed between pixel electrodes 102a and 102b formed on a substrate 101, and an opposing electrode 103 formed on an opposing substrate 104, as shown in FIG. 10, is referred to as a vertical direction electric field 105 in this specification. Further, an electric field formed between the adjacent pixel electrodes 102a and 102b is referred to as a horizontal direction electric field 106 in this specification.

Liquid crystals in the vicinity of the pixel electrodes orient themselves along the horizontal direction electric field if the line inversion drive is performed, the liquid crystal orientation in edge portions of the pixel electrodes becomes nonuniform, and disclinations develop. In order to obtain a good quality black level, light shielding films for covering the disclinations are necessary. However, the aperture ratio drops if the disclinations are covered by the light shielding films. It is necessary to come up with a scheme in which a good quality black level can be obtained, and as little disclination as possible develops when displaying a high aperture ratio, bright image. Note that, in this specification, liquid crystal orientation irregularities developing due to differences in the direction of the pre-tilt angle, and differences in the twist direction, at liquid crystal orientation film interfaces are referred to as "disclinations". Further, regions having different brightnesses produced due to an irregular orientation state of the liquid crystals when a polarization plate is formed is referred to as "light leakage".

In particular, the occupied ratio of pixels in which disclinations and light leakage developing due to horizontal direction electric fields is large enough that it cannot be ignored in liquid crystal display devices in which the pixels are formed at a very fine pitch, such as that of a projecting liquid crystal display device. Further, these disclinations and light leakage are expanded when projected onto a screen with the projecting liquid crystal display device, and therefore whether or not the light leakage and disclinations can be suppressed is vital in maintaining contrast.

SUMMARY OF THE INVENTION

An object of the present invention is to provide an element structure such that liquid crystal disclination and light leakage can be stopped in an active matrix liquid crystal display device.

The following measures are taken in order to solve the above stated problems with the conventional technique.

Overlapping edge portions of pixel electrodes with predetermined height convex portions.

FIG. 2 is a cross sectional diagram of a simulation model. The present invention utilizes moving disclinations and light leakage, which are caused when a voltage is applied to liquid crystal 202, to edge portions of pixel electrodes by forming edge portions of pixel electrodes 203a and 203b on a first substrate (not shown) so as to overlap with convex portions 204 formed on a level surface as shown in FIG. 2. An opposing electrode 201 is formed in an opposing substrate 207.

Note that, in this specification, the convex portions are formed selectively below the pixel electrodes. Regions in which the pixel electrodes overlap with upper edge portions of the convex portions are referred to as first regions (a) of the pixel electrodes. Regions in which the pixel electrodes are formed in side portions of the convex portions are referred to as second regions (b) of the pixel electrodes. Regions in which the pixel electrodes are formed on a level surface, and which contact the second regions of the pixel electrodes, are referred to as third regions (c) of the pixel electrodes.

Further, the height (h) of the convex portions is the maximum value of the length of a vertical line formed from the upper edge portions of the convex portions to the level surface on which the convex portions are formed.

In addition, a cell gap (d) is the distance from the opposing electrode formed on the opposing substrate (second substrate) to the third region of the pixel electrode.

An inter-pixel electrode distance (s) is the distance between the first regions of mutually adjacent pixel electrodes.

Conventionally, if there are convex portions in the orientation surface of liquid crystals, then the orientation of the liquid crystal is disordered and light leakage develop at the convex portions, and therefore it is thought that a liquid crystal orientation surface should be as level as possible. However, the applicants of the present invention found that when the first regions of the pixel electrodes formed on the convex portions having a predetermined height, and the second regions of the pixel electrodes formed on the side portions of the convex portions having a predetermined height, are present, simulation results on the liquid crystal orientation show that liquid crystal orientation irregularities caused by the horizontal direction electric field in driving a liquid crystal display device can be reduced. Specifically, locations at which disclinations and light-leakage appear are in the edges of the pixel electrodes during black display.

This phenomenon is explained by the schematic diagrams of FIGS. 1A to 1C which show the principles of the present invention. The liquid crystal orientation method is taken as a TN method. FIGS. 1A to 1C show liquid crystal orientations when driving a liquid crystal display device by a 5 V or −5 V video voltage with line inversion drive. An orientation film is not shown in the figures.

First, as shown in FIG. 1A, if edge portions of the pixel electrodes 203a and 203b formed on the first substrate (not shown in the figures) are formed on the convex portion 204, then it becomes more difficult for disclinations to develop, compared to the case where no convex portion presents. Nevertheless, if the height of the convex portion is low, then the influence of a horizontal direction electric field formed between the pixel electrode 203a and the pixel electrode 203b is strong with respect to a vertical direction electric field formed between the pixel electrodes 203a and 203b and the opposing electrode 201 formed on the second substrate (not shown in the figures). Liquid crystal molecules 208 in the vicinity of the convex portion orient with an inclination in a diagonal direction with respect to the substrate surface. Thus, light leakage can be seen below a cross Nicol polarization plate. Further, a pre-tilt angle of liquid crystal molecules 209 in the vicinity of the interface of the orientation film is determined by rubbing directions 205 and 206, and therefore a disclination 210 having high light strength is formed at the point where the direction of the horizontal direction electric field in the vicinity of the interface differs from the direction of the liquid crystal molecules in the vicinity of the interface due to rubbing.

However, the higher the convex portion becomes, the more the position at which the disclination 210 seen in FIG. 1A appears changes to the edge of the pixel electrode. In addition, if the convex portion 204 overlapping with the edge portions of the pixel electrodes 203a and 203b is made higher, then a vertical direction electric field formed between a first region 215 of the pixel electrode and the opposing electrode 201 becomes stronger with increasing the height of the convex portion, as shown in FIG. 1B, and the influence of the horizontal direction electric field becomes weaker. Several vertical direction electric fields are formed almost in the substrate surface by an electric field formed between a second region 212 of the pixel electrode, among the pixel electrodes 203a and 203b, formed in the side portion of the convex portion and the opposing electrode 201. TN method liquid crystals are positive type liquid crystals, and therefore the longitudinal axes of liquid crystal molecules 211 orient parallel to the electric fields. Disclination and light leakage in the vicinity of the convex portion is thus reduced.

Next, as shown in FIG. 1C, if the height of the convex portion 204 is made higher, then the liquid crystals on the pixel electrode 203b form an electric field having a direction diagonal with respect to the substrate surface, the same direction as the pretilt angle, between the opposing electrode and the second region of the pixels. Thus, liquid crystal molecules 213 orient diagonally with respect to the substrate surface, along the electric field, and a light leakage having a width which cannot be ignored is formed in the vicinity of the convex portion. On the pixel electrode 203a, an electric field having a direction diagonal with respect to the substrate surface and formed between a second region 216 of the pixel electrode and the opposing electrode is opposite to the direction of the pre-tilt angle of the liquid crystals, and therefore it is difficult for liquid crystals 217 to follow the electric field, and formation of light leakage becomes relatively difficult. However, the width of the light leakage formed due to the electric field formed between the opposing electrode and the second region 212 of the pixel electrode 203b becomes wider, and overall, the aperture ratio drops.

It can be understood from the above that the optimal value of the height of the convex portion exists in order to reduce both the disclination of black display and the width of the light leakage when the edge portions of the pixel electrodes are formed on the convex portion. If the convex portion is too tall, then overall, the width of the light leakage will become larger (see FIG. 1C.) The structures of FIG. 1A and FIG. 1B can increase the aperture ration. The subsequent simulation results substantiate these principles.

The optimal value of the height of the convex portion can be considered to be determined with a cell gap (namely, an element for determining the strength of the vertical direction electric field) as a parameter.

The applicants of the present invention performed simulations, and confirmed the optimal value of the convex portion height.

Disclination and light leakage due to horizontal direction electric fields become problems in particular when the pixel area is small, and the proportion of the pixel occupied by the disclination and the light leakage is large enough that it cannot be ignored. In other words, mainly for cases where the device is used as a projection liquid crystal display device. Projection liquid crystal display devices have a small pixel pitch, and inevitably the distance between the pixel electrodes is small at 4.0 μm or less. The applicants of the present invention performed simulations focusing on inter-pixel electrode distances of equal to or less than 4.0 μm in order to reduce the disclination and the light leakage in the projection liquid crystal display device.

A simulation model is shown in FIG. 2. The opposing electrode 201, the liquid crystals 202, the convex portion 204, and the pixel electrodes 203a and 203b become the structural elements of the simulation model in FIG. 2. The simulation model of FIG. 2 was taken as one unit, and periodically repeated.

The simulation parameters are as follows:
cell gap, d: 4.5 μm, 3.0 μm;
distance between pixel electrodes, s: 2 μm, 4 μm;
convex portion height, h: 0 μm, 0.2 μm, 0.3 μm, 0.4 μm, 0.5 μm, 0.7 m, 1.0 μm, and 1.5 μm; and
pixel pitch, p: 18 μm, 43 μm.
Fixed conditions in the simulations are as follows:
width of first region of pixel electrode, o: 1.0 μm;
electric potential of the pixel electrode 203a: +5 V;
electric potential of the pixel electrode 203b: −5 V; and electric potential of the opposing electrode 201: 0 V.

In order to generalize the relationship between the distance s between pixel electrodes, the cell gap d, and the height h of the convex portion on which the edge portion of the pixel electrode is formed, the simulation was performed with cell gaps of 4.5 μm and 3.0 μm. ZLI4792 was used for the liquid crystals for both cell gaps, 4.5 μm and 3.0 μm, and the orientation was found by computation.

The pre-tilt angle of the liquid crystals was set to 6.0°, and the chiral pitch was set to left handed at 70 μm. The rubbing direction 205 and 206 are shown in FIG. 2. The twist angle is 90°. The orientation of the liquid crystal is TN method.

Further, in order to increase the number of evaluations and grasp the tendencies, the simulations were performed as stated above with two pixel pitches.

Liquid crystal orientation simulation software from Syntech Corp. entitled LCD Master 2SBENCH was used, and simulations of the liquid crystal orientation ware run. 2SBENCH shows the liquid crystal orientation by a two-dimensional planer surface composed of the cell cap direction and the substrate surface direction.

The simulation results are as shown below. FIGS. 3 to 8 are partial blowup diagrams of the simulation results.

FIGS. 3 to 8 are simulations in which the height of the convex portion was changed at conditions of the gap d set to 4.5 μm, the inter-pixel spacing distance s set to 2.0 μm, and the pixel pitch p set to 18 μm. The transmittivity in each coordinate, calculated from equipotential lines, liquid crystal directors, and index of refraction anisotropy, is shown. The pixel electrode 203a has coordinates from 1 to 17 μm, and the pixel electrode 203b has coordinates from 19 to 35 μm, and FIGS. 3 to 8 show blowups of the points at which there is light leakage and disclination in the vicinity of the convex portion. The liquid crystal is a positive type, and therefore lines of electric force can be considered to have nearly the same direction as the director of the liquid crystals.

The orientation of the liquid crystals on a pixel electrode having a −5V electric potential is explained below.

A horizontal electric field is formed up through a region entering the inside of the pixel electrode when there is no convex portion, as shown in FIG. 3. Further, disclinations develop in regions in which the direction of the horizontal electric field and the direction of the liquid crystal pre-tile angle are opposite.

When the height of the convex portion is 0.3 μm, the vertical direction electric field becomes stronger due to the first region of the pixel electrode formed in the upper edge portion of the convex portion, and therefore the position of the disclination moves toward the outside of the pixel electrode, as shown in FIG. 4, compared with the case of no convex portion in FIG. 3.

If the height of the convex portion becomes taller at 0.7 μm, as shown in FIG. 5, then there are many liquid crystals which become oriented perpendicular to the substrate along the lines of electric force due to the effect of the horizontal direction electric field becoming stronger, and due to the effect of the electric force lines, due to the second region of the pixel electrode formed in the side portion of the convex portion and the opposing electrode, possessing components nearly perpendicular with respect to the substrate surface. The disclination in the vicinity of the convex portion becomes less.

When the height of the convex portion becomes higher at 1.0 μm, the width of the disclination in the vicinity of the convex portion drops by just 0.2 μm compared with the case in which the convex portion height is 0.7 μm, as shown in FIG. 6.

As shown in FIG. 7, the lines of electric force formed by the second region of the pixel electrode formed in side portion of the convex portion, and by the opposing electrode, possess an angle order of 60°, with respect to the substrate surface, in the vicinity of the convex portion, which becomes at 1.5 μm. The liquid crystals orient along the electric force lines, and light leakage is formed near the convex portion.

Note that the angle of the electric force lines with respect to the substrate surface is estimated from the distribution of equipotential lines.

In FIG. 8, the height of the convex portion increases to 3.0 μm, and the vertical direction electric field becomes stronger. The liquid crystals on the third region of the pixel electrode of the edge portion of the convex portion therefore orient nearly perpendicular to the surface of the substrate. However, the electric field formed between the second region of the pixel electrode formed in the side portion of the convex portion, and the substrate surface, possesses an angle on the order of 30°, with respect to the substrate surface, and the liquid crystals orient along the lines of electric force. Broad light leakage is consequently formed in the vicinity of the convex portion.

The orientation of the liquid crystals of FIG. 4 corresponds to the schematic diagram of FIG. 1A The orientation of the liquid crystals of FIG. 5 and FIG. 6 corresponds to the schematic diagram of FIG. 1B, and the orientation of the liquid crystals of FIG. 7 and FIG. 8 corresponds to the schematic diagram of FIG. 1C. Namely, it is confirmed that the light leakage of the liquid crystals becomes larger if the height of the convex portion exceeds an upper limit.

In order to improve the display quality, a systematic simulation was performed. The distance between one edge portion and another edge portion of the disclination and the light leakage influencing the aperture ratio was paid attention to.

Data was also taken regarding the light leakage and the disclination width of a pixel electrode having a −5 V electric potential. This is because the light leakage and the disclination of a pixel electrode having a −5 V electric potential greatly influences the display quality due to high light strength.

FIG. 9 and FIG. 36 show the simulation results. FIG. 9 is a figure in which the height h of the convex portion, the light leakage and the disclination width x are graphed with respect to the cell gap d in the simulation model of FIG. 2. The term light leakage and disclination width x denotes the width of a region having high brightness due to disclination and light leakage formed on both sides of the convex portion.

FIG. 36 is a figure in which the height h of the convex portion, and the light leakage and the disclination width y are graphed with respect to the cell gap d in the simulation model of FIG. 2. The term light leakage and disclination width y denotes the width of a region having high brightness due to disclination and light leakage formed in one side of the convex portion, namely in an electrode side having a −5 V electric potential.

Simulations were performed with the pixel pitch p set to 18 μm and 43 μm when the cell gap was 4.5 μm. Further, the distance s between adjacent pixel electrodes was set to 2.0 μm or to 4.0 μm.

When the cell gap was 3.0 μm, the distance s between adjacent pixel electrodes was set to 2.0 μm or 4.0 μm. The pixel pitch p was set to 18 μm.

The relationship between the convex portion height, and the width of the light leakage and the disclination shows similar tendencies in both FIG. 9 and FIG. 36.

First, the relationship between the convex portion height and the light leakage and disclination width nearly did not change in accordance to pixel pitch. This is because formation of light leakage and disclination is a phenomenon caused by the horizontal direction electric field and the vertical direction electric field of the edge portions of the pixel electrodes.

Further, light leakage and disclination become relatively less with a smaller distance between adjacent pixel electrodes.

The regions of orientation irregularities of the liquid crystals, typically light leakage and disclination, are reduced along with increasing height of the pixel portion, and are not due to the pixel pitch p and the cell gap d, in both FIG. 9 and FIG. 36. If the height of the convex portion becomes too tall, there are conversely more regions of orientation irregularities. An optimal convex portion height is determined by the distance between the cell gap and the pixel electrode.

Considering the inflection point of the graph, it is preferable that the height of the convex portion in which the effect of a reduction in the liquid crystal regions having orientation irregularities appears significantly, be equal to or greater than 4.4% of the cell gap, and equal to or less than 22.5% of the cell gap when the call gap is 4.5 μm.

When the cell gap is 3.0 μm as well, and the distance s between the pixel electrodes is equal to or less than 2.0 μm, a good effect of reducing, compared to a case in which there is no convex portion, the regions having orientation irregularities can be obtained by setting the height of the convex portion to be equal to or greater than 4.4% of the cell gap, and equal to or less than 22.5% of the cell gap.

If the height of the convex portion is less than 4.4% with respect to the cell gap, then the width of the light leakage and the disclination does not change much, even if the height of the convex portion is increased. If the height of the convex portion exceeds 22.5% to the cell gap, then the light leakage and the disclination width increases.

Further, orientation irregularities of the liquid crystals easily develop due to rubbing non-uniformity if the convex portion is high, and therefore reducing the height of the convex portion, thereby reducing the light leakage and the disclination width, is preferable to insure display quality. Consequently, for a case in which the cell gap is 4.5 μm, the height of the convex portion may be suppressed to be greater than or equal to 4.4% of the cell gap, and less than or equal to 15.6% of the cell gap. Nearly equal light leakage and disclination reduction effects are obtained when the height of the convex portion is with the range of greater than or equal to 4.4%, and less than or equal to 22.5%, of the cell gap.

Further, when the cell cap is 3.0 μm and the distance s between the pixel electrodes is equal to or less than 2.0 μm, a good effect of reducing the light leakage and the disclination is obtained when the height of the convex portion is greater than or equal to 4.4% of the cell gap, and less than or equal to 15.6% of the cell gap, the same as when the height of the convex portion was set equal to or greater than 4.4%, and equal to or less than 22.5%, of the cell gap.

Conversely, there was more light leakage when the height of the convex portion was 22.5% when the distance s between the pixel electrodes was set to 4.0 μm. Inclusive of when the distance between the pixel electrodes is 4.0 μm, it is therefore preferable that the height of the convex portion be equal to or greater than 4.4%, and equal to or less than 15.6%, or the cell gap.

In other words, under conditions of the distance between the pixel electrodes being equal to or less than 4.0 μm, the height of the convex portion may be set equal to or greater than 4.4%, and equal to or less than 22.5%, of the cell gap when the cell gap is equal to or greater than 3.0 μm, and equal to or less than 4.5 μm. The height of the convex portion is preferably set greater than or equal to 4.4%, and less than or equal to 15.6%, of the cell gap.

The smaller the cell gap, the smaller the height of the convex portion needed for reducing the light leakage and the disclination width. For cases of the call gap being from 3.0 μm to 4.5 μm, good liquid crystal orientation can be obtained with a convex portion height of 15.6% or less. For cases of the cell gap being less than 3.0 μm, it is therefore considered that the necessary convex portion height will be 15.6% or less to sufficiently reduce the light leakage and disclination width.

The height of the convex portion may be set equal to or less than 15.6% of the cell gap when the cell gap is less than or equal to 3.0 μm. Of course, considering the inflection point of the graph, it can be expected that a good effect will also be obtained if the height of the convex portion is set equal to or less than 6.7% of the cell gap.

When the cell gap is 3.0 μm, the light leakage and the disclination width are monotonically reduced as the convex portion becomes higher, provided that the height of the convex portion is equal to or less than 6.7% with respect to the cell gap. If the cell gap is made smaller at less than or equal to 3.0 μm, it can be considered that the region in which the light leakage and the disclination width are monotonically reduced with increasing convex portion height is in a range in which the height of the convex portion does not exceed 6.7% with respect to the cell gap.

An upper limit to the height of the convex portion, or both upper and lower limits, can thus be determined. There is a concern that rubbing irregularities may occur if the fiber tips of a rubbing cloth are disordered, and therefore the determination of an upper limit for the height of the convex portion is necessary in order to manufacture a liquid crystal panel. Further, the optimal value of the height of the convex portion with respect to the cell gap tends to become smaller as the cell gap becomes smaller.

An optimal value for the height of the convex portion thus determined can be used not only for the TN method, but can also be widely used as means for hiding liquid crystal disclination in a normally white mode orientation method.

The optimal value of the convex portion height is one in which the lines of electric force formed by a horizontal direction electric field and a vertical direction electric field of an active matrix liquid crystal display device are suitably regulated, and as shown in FIG. 1B, one in which regions with generated electric force lines possessing components perpendicular to the surface of the substrate are increased in the edge portions of the pixel electrode.

Therefore, although the simulations were performed for a transmitting type liquid crystal display device, it can be considered possible to apply the present invention to a reflective type liquid crystal display device as well. This is because a voltage may also be applied to the pixel electrodes with a reflective type liquid crystal display device, and when orienting the liquid crystals by a vertical direction electric field, unnecessary electric fields directed diagonally with respect to the substrate surface are reduced, and light leakage and disclination of the edge portions of the pixel electrodes can be reduced.

Further, the simulation was made using the TN method, but the liquid crystal orientation method is not limited to the TN method. This is because, in an active matrix liquid crystal display device, unnecessary electric fields directed diagonally with respect to the substrate surface can be reduced by optimizing the convex portion height when orienting the liquid crystals by using a vertical direction electric field. For example, it is considered that it is possible to apply the present invention to methods such as an OCB (optically controlled birefringence) method, an STN method, and an EC method using homogeneously oriented cells.

Further, provided that orientation faults are not induced in the liquid crystals by the convex portion, it is thought that it is also possible to apply the present invention to an orientation method using sumectic liquid crystals. For example, it is possible to apply the present invention to a liquid crystal display device using ferroelectric liquid crystals or anti-ferroelectric liquid crystals. Further, by adding high molecular weight molecules with liquid crystal properties to these liquid crystals, it is thought that it is also possible to apply the present invention to liquid crystal display devices using materials hardened by irradiation of light (for example, ultraviolet light).

The simulations were performed with an angle 90° (hereafter referred to as a convex portion taper angle) formed between the surface contacting the second region of the pixel electrode formed in the side surface of the convex portion, and the third region of the pixel electrode formed in the level surface. However, it is also possible to apply the present invention if the convex portion taper angle is less than 90°. As shown in the cross sectional diagram of FIG. 35 for the lines of electric force when the convex portion has a taper, the electric force lines are generated in a direction perpendicular to a conductor for cases in which the taper angle 0 of the convex portion 204 is less than 90°, and therefore the bend of electric force lines 218 formed between the opposing electrode 201 and second regions 219 of the pixel electrodes 203$a$ and 203$b$ becomes relaxed when the convex portion has a taper. Liquid crystals 220 orient very well perpendicular with respect to the substrate surface. A very large effect in reducing light leakage and disclination is therefore obtained, compared to when the taper angle is 90°, by using the relationship shown in the present invention between a convex portion height 221 and the cell gap when the convex portion has a taper.

Width of the First Region of the Pixel Electrode on the Upper Portion of the Convex Portion Next, changes in the orientation of liquid crystals when the width of the first region of the pixel electrode formed overlapping with the upper portion of the convex portion is investigated.

A simulation model is shown in FIG. 2. The opposing electrode 201, the liquid crystals 202, the convex portion 204, and the pixel electrodes 203$a$ and 203$b$ become the structural elements in FIG. 2.

The simulation parameters are as follows:
cell gap, d: 4.5 μm;
distance between pixel electrodes, s: 2 μm, 4 μm;
convex portion height, h: 0 μm, 0.5 μm; and
width of first region of pixel electrode, o: −1 μm, −0.5 μm, 0 μm, 0.5 μm, 1.0 μm.

The symbol for the width o of the first region of the pixel electrode, such as −1.0 μm, indicates that the pixel electrode is not formed on the convex portion, and that the edge portion of the pixel electrode is located at 1.0 μm from the convex portion.

Fixed conditions in the simulations are as follows:
electric potential of the pixel electrode 203$a$: +5 V;
electric potential of the pixel electrode 203$b$: −5 V;
electric potential of the opposing electrode 201: 0 V; and
pixel pitch, p: 18 μm.

Simulation results are shown in the cross sectional diagrams of FIG. 11 to FIG. 15. The distance s between pixel electrodes is 2.0 μm.

In FIG. 11, there is no convex portion. The convex portion and the pixel electrode do not mutually overlap in FIG. 12, and the edge of the pixel electrode is located 0.5 μm from the edge of the convex portion. In other words, the second region of the pixel electrode and the first region of the pixel electrode do not exist in FIGS. 11 and 12. Light leakage from the edges of the pixel and the disclination width x shows no change at all at this point in FIG. 11 and FIG. 12.

The pixel electrode is formed in the side portion of the convex portion in FIG. 13. Namely, there is a second region of the pixel electrode. Compared to FIGS. 11 and 12, the position of the disclination on a pixel electrode having a −5 B electric potential, moves 0.4 μm to the pixel edge. The vertical direction electric field is made stronger, and the horizontal direction electric field becomes a little weaker due to the second region of the pixel electrode.

The first region of the pixel electrode formed in the edge portion on the convex portion, and the second region of the present invention formed in the side portion of the convex portion exist in FIG. 14. The width of the first region of the pixel electrode is 0.5 μm. The vertical direction electric field becomes stronger, and the disclination on the pixel electrode having a −5V electric potential moves to the edge of the pixel electrode due to the first region of the pixel electrode.

The width of the first region of the pixel electrode is set to 1.0 μm in FIG. 15, compared to 0.5 μm in FIG. 14. The vertical direction electric field is made additionally stronger with respect to the horizontal direction electric field due to the 1.0 μm width, and the disclination on the pixel electrode having a −5 V electric potential moves to the edge of the pixel electrode.

It can thus be understood that there is a disclination reduction effect due to the existence of the first region of the pixel electrode and the second region of the pixel electrode.

Next, data is added for when the distance s between the pixel electrodes is 4.0 μm, and data is systematically taken. FIGS. 16A and 16B show the simulation results. FIG. 16A is a graph of the width o of the first region of the pixel electrode, and the light leakage and the disclination width x, versus the cell gap d, in the simulation model of FIG. 2. The term light leakage and disclination width x here indicates the width of a region having high brightness causes by disclination and light leakage formed in both sides of the convex portion.

FIG. 16B is a graph of the width o and the light leakage and the disclination width y, versus the cell gap d, in the simulation model of FIG. 2. The term light leakage and disclination width y here indicates the width of a region having high brightness causes by disclination and light leakage formed in one side of the convex portion, namely in the electrode side having an electric potential of −5V.

From FIGS. 16A and 16B, it can be understood that there is an effect in which disclination and light leakage are reduced if the width o of the first region of the pixel electrode is equal to or greater than 0.5 μm, preferably equal to or greater than 1.0 μm, without dependence on the distance s between the pixel electrodes.

The light leakage and the disclination width when the width of the first region of the pixel electrode is 0 μm in FIGS. 16A and 16B shows a light leakage and disclination width of a state in which the pixel electrode is only formed in the side surface of the convex portion. Compared to cases in which the width of the first region of the pixel electrode is equal to or greater than 0.5 μm, or equal to or greater than 1.0 μm, the effect of reducing the light leakage and the disclination width is reduced. However, compared to the case in which the width of the first region of the pixel electrode is −0.5 μm, in which the pixel electrode does not contact the convex portion at all, the light leakage and the disclination width do drop.

An actual experiment in which the width over which the convex portion and the pixel electrode overlap was carried out. FIG. 33A is an upper surface diagram of a substrate having a convex portion, and FIGS. 33B and 33C are cross sectional diagrams of the substrate having the convex portion.

Pixel electrodes 301a denoted by slanted line portions in the upper surface diagram of FIG. 33A all have the same electric potential. Further, the pixel electrodes 301b denoted by vertical line portions all have the same electric potential. This is in order to correct adjacent pixel electrodes by a transparent conducting film 300 having a width of 3 µm. Assuming line inversion driving, an electric potential of +5 V is imparted to the pixel electrodes 301a. In addition, an electric potential of −5 V is imparted to the pixel electrodes 301b. A rubbing direction 302 for the substrate having a convex structure is shown in the figures. A rubbing direction for a substrate opposing the substrate having the convex structure is perpendicular to the rubbing direction 302.

A cross section of the upper surface diagram of FIG. 33A cut along the dashed line G-G' is shown in FIG. 33B. A cross section of the upper surface diagram of FIG. 33A cut along the dashed line H-H' is shown in FIG. 33C. Identical reference symbols are used for the same portions as in FIG. 33A. The edge portions of the pixel electrode 301a and 301b formed on the substrate 303 contact a convex portion 304. The distance between the adjacent pixel electrodes 301a and 301b was set constant at 2.0 µm, and the liquid crystal orientation was confirmed by changing the width of the pixel electrode overlapping on the convex portion, namely by changing the width 305 of the first region of the pixel electrode. The width of the first region of the pixel electrode was set to −1.0 µm, 0 µm, 0.5 µm, and 1.0 µm. The cell gap was 4.5 µm, the height of the convex portion was 0.5 µm, and the pixel pitch was 18 µm.

Photographs of the liquid crystal orientation when the pixel electrode structure of FIGS. 33A to 33C was used are shown in FIGS. 34A to 34D. The adjacent pixel electrodes in the horizontal direction of the page have the same electric potential. The rubbing direction was perpendicular to the page. An effect of reducing the disclination width was found in the experiments as well if the width o of the first region of the pixel electrodes was equal to or greater than 0.5 µm, preferably equal to or greater than 1.0 µm. It was found that the disclination and the light leakage width extending in the horizontal direction of the page decreases along with increases in the width o of the first region or the pixel electrodes.

BRIEF DESCRIPTION OF THE DRAWINGS

In the accompanying drawings:

FIG. 2 is a cross sectional diagram showing a simulation model of the present invention;

FIG. 15 is a cross sectional diagram showing simulation results when there is a pixel electrode in a side portion and an upper edge portion;

FIGS. 21A to 21C are cross sectional diagrams showing a process of manufacturing an active matrix substrate (Embodiment 1);

FIGS. 22A to 22C are cross sectional diagrams showing the process of manufacturing an active matrix substrate (Embodiment 1);

FIG. 26 is a cross sectional diagram showing a liquid crystal display device (Embodiment 3);

FIG. 27 is a cross sectional diagram showing a process of manufacturing an active matrix substrate (Embodiment 2);

DETAILED DESCRIPTION OF THE PREFERRED EMBODIMENTS

Embodiment Mode

An embodiment mode of the present invention is shown in FIGS. 17 to 20. Note that the same reference symbols are used in FIGS. 17 to 20 for portions having identical functions.

Figure 17:
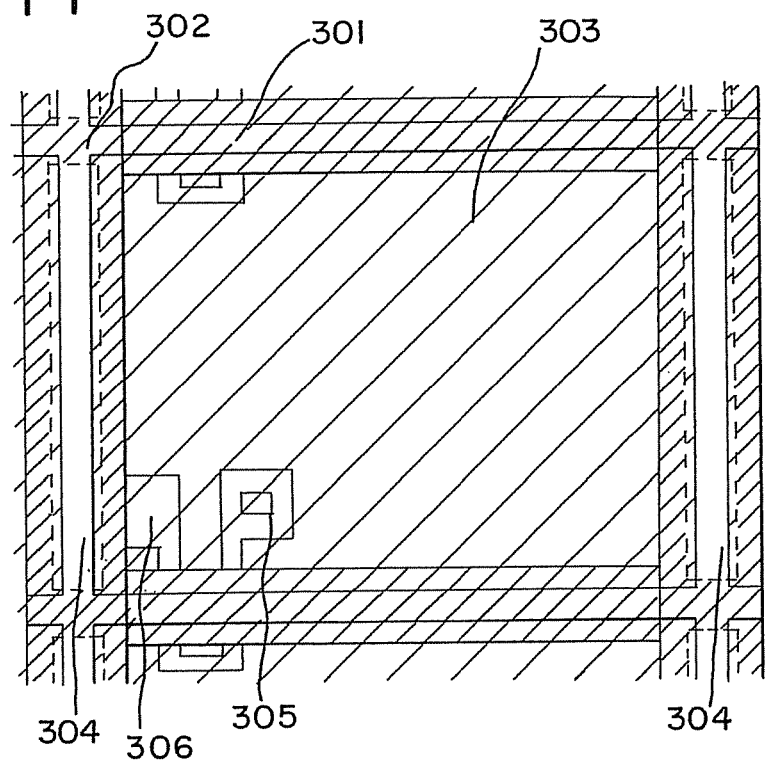
FIG. 17 is an upper surface diagram showing an example of an embodiment mode of the present invention.

The upper surface diagram of a pixel shown in FIG. 17 shows a semiconductor layer 306, a gate wiring 301 which becomes a gate electrode of the semiconductor layer, a source wiring 302 which is electrically connected to a source region of the semiconductor layer, and a pixel electrode 303 electrically connected to a drain region of the semiconductor layer through a contact hole 305. In FIG. 17A, a convex portion 304 of the present invention is formed on the source wiring 302, parallel to the source wiring. There is an effect of reducing disclination and light leakage formed parallel to the source wiring in edge portion of the pixel electrode when performing source line inversion drive. Showing the effect of the present invention is a first region of the pixel electrode formed overlapping with an upper edge portion of the convex portion, and a second region of the pixel electrode formed in a side portion of the convex portion. The convex portion is therefore formed mutually overlapping with the pixel electrode.

When gate line inversion drive is performed, the convex portion of the present invention may be formed parallel to the gate wiring.

Figure 18:
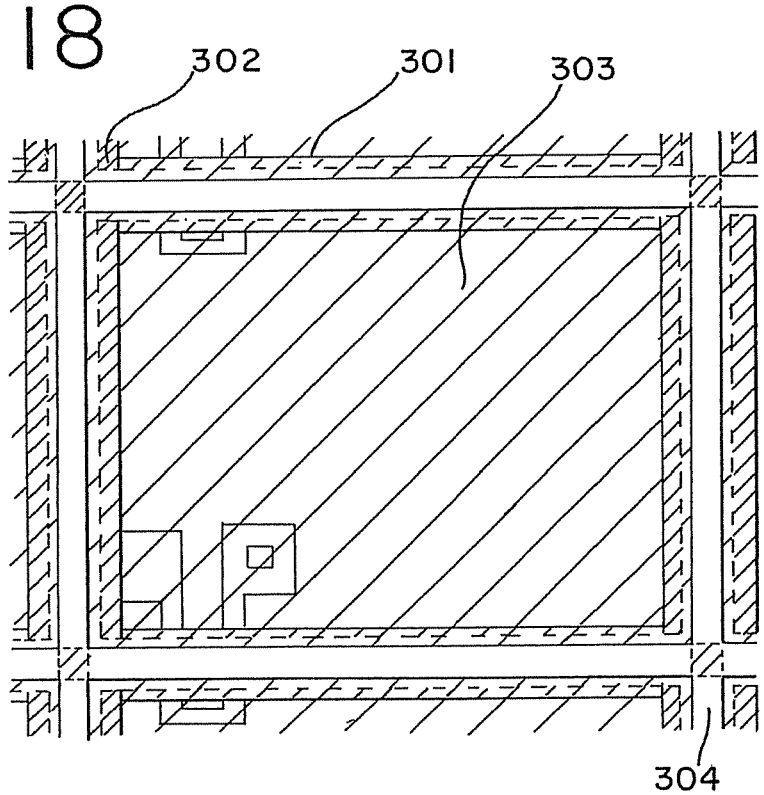
FIG. 18 is an upper surface diagram shown an example of an embodiment mode of the present invention.

An upper surface of the pixel shown in FIG. 18 has the convex portion 304 of the present invention formed parallel to the source wiring 302 and the gate wiring 301. For example, the horizontal direction electric field develops not only in the space between adjacent electrodes sandwiched by the source wirings, but also between adjacent pixel electrodes sandwiched by the gate wirings when source line inversion drive is performed. FIG. 18 possesses effects of lowering disclination and light leakage formed by the horizontal direction electric field between adjacent pixel electrodes sandwiched by the gate wirings. The convex portion is the same as that of FIG. 17, and is formed in a region mutually overlapping with the pixel electrode.

Figure 19:
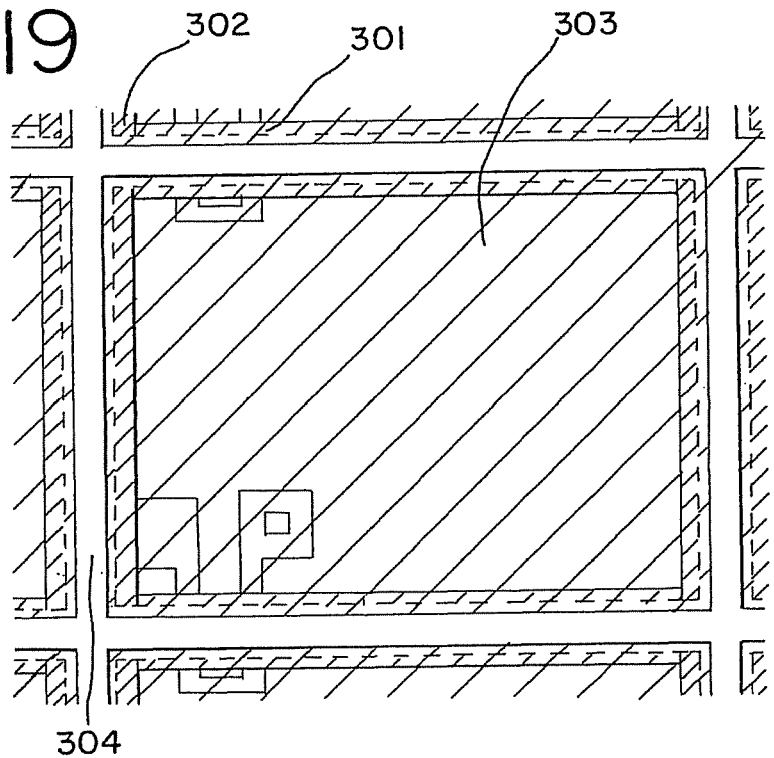
FIG. 19 is an upper surface diagram shown an example of an embodiment mode of the present invention.

An upper surface of the pixel shown in FIG. 19 has the convex portion 304 of the present invention formed in parallel with the source wiring 302 and the gate wiring 301. In FIG. 18, the convex portion is tall, and the fiber tips of a rubbing cloth do not reach a concave portion in a gap between the convex portions 304 of FIG. 18, and rubbing irregularities may develop. In order to make the rubbing uniform in FIG. 19, convex portions are also formed as dummy patterns in portions at which the convex portions and the pixel electrodes 303 do not overlap.

The height of the convex portions may be set equal to no greater than 4.4% of the cell gap, and equal to or less than 22.5% of the cell gap, preferably between 4.4% and 15.6% of the cell gap, when the cell gap is equal to or greater than 3.0 um, and equal to or less than 4.5 μm, in FIGS. 17 to 19. Further, when the cell gap is less than 3.0 μm, it is preferable to set the height of the convex portions equal to or less than 15.6% of the cell gap, more preferably equal to or less than 6.7% of the cell gap. It is preferable that the height of the convex portions be equal to or less than 15.6% of the cell gap if the cell gap is greater than 4.5 μm.

Figure 20:
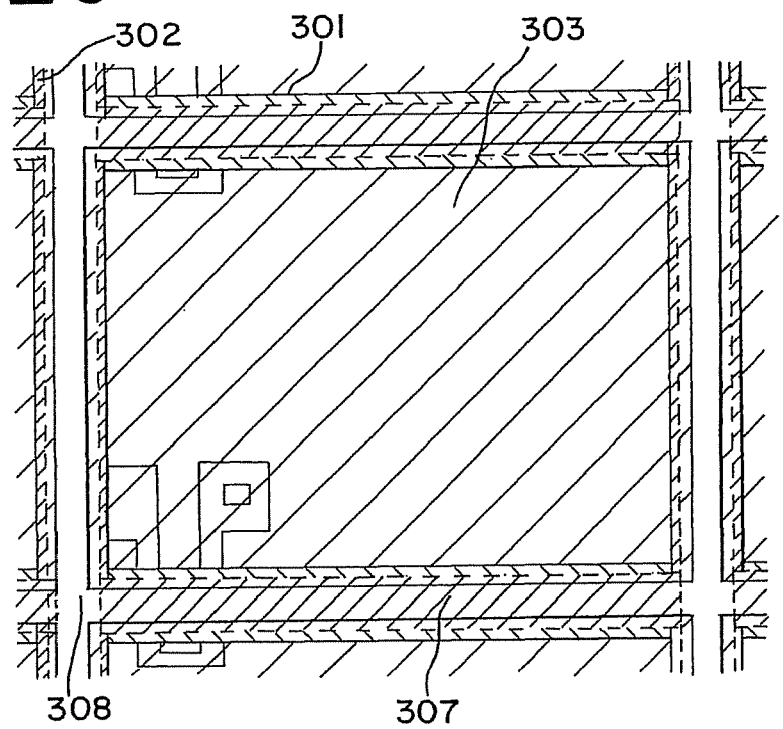
FIG. 20 is an upper surface diagram shown an example of an embodiment mode of the present invention.

An upper surface of the pixel shown in FIG. 20 has the convex portion of the present invention formed in parallel with the source wiring 302 and the gate wiring 301. The height of the convex portion changes depending upon location. For example, the horizontal direction electric field when source line inversion drive is performed is formed not only between adjacent pixel electrodes sandwiched by the source wirings 302, but also between adjacent pixel electrodes sandwiched by the gate wirings 301. The horizontal direction electric field between the adjacent pixel electrodes sandwiched by the source wirings is larger, of course. Considering the way that the electric force lines formed between the adjacent pixel electrodes are formed, the height of the convex portion may be changed. In FIG. 20, a convex portion 307 having a first height, and a convex portion 308 having a second height are shown. The height of the convex portions may be additionally changed depending on the way the electric field is formed. For example, it is also possible to make the convex portion having the first height relatively higher than the convex portion having the second height, depending on the way the lines of electric force are formed.

The heights of the convex portion having the first height and the convex portion having the second height are preferably equal to or greater than 4.4%, and equal to or less than 22.5%, of the cell gap, and may be set equal to or greater than 4.4%, and equal to or less than 15.6%, of the cell gap when the cell gap is from 3.0 μm to 4.5 μm. Further, if the cell gap is less than 3.0 μm, it is preferable that the convex portion having the first height and the convex portion having the second height be equal to or less than 15.6% of the cell gap, more preferably equal to or less than 6.7% of the cell gap. When the cell gap is greater than 4.5 μm, it is preferable that the convex portion having the first height and the convex portion having the second height be equal to or less than 15.6% of the cell gap.

The convex portions may be formed by patterning a photosensitive organic resin film, or an organic resin film, by a photolithography process. It is also possible, of course, to form the convex portion by patterning an inorganic film such as a silicon oxide film, a silicon nitride film, or a silicon oxynitride film.

The light sensitive resin film may be formed twice in order to change the height of the pixel portions by location. Further, substrate elements such as semiconductor layers, gate wirings, and source wirings may also be formed in locations at which one wants to increase the height of the convex portions, and may be formed selectively in a convex shape before forming the pixel electrodes.

Further, in FIGS. 17 to 20 the width of the first region of the pixel electrode formed in the upper portion of the convex portion may be set equal to or greater than 0.5 μm, preferably equal to or greater than 1.0 μm.

The present invention is not limited by the above stated embodiment mode, and it is also possible to combine the characteristics of the embodiment mode.

Embodiments

Embodiment 1

An embodiment of the present invention is explained using FIGS. 21A to 25.

Note that a description is set forth regarding a step for fabricating a pixel TFT; a switching element of the pixel portion and TFTs for driver circuit (a signal line driver circuit and a scanning line driver circuit) provided in the pixel portion of a display device using the driver method of the present invention and periphery portion of the pixel portion. For the simplicity of the explanation, a CMOS circuit, which is a fundamental structure circuit for the driver circuit portion, and the n-channel TFT for the pixel TFT of the pixel portion are shown in figures by a cross-sectional figure according to the path.

First, as shown in FIG. 21A, a base film 401 made of an insulating film such as a silicon oxide film, a silicon nitride film, or a silicon oxynitride film, is formed on a substrate 400 made of a glass such as barium borosilicate glass or aluminum borosilicate glass, typically a glass such as Corning Corp. #7059 glass or #1737 glass. For example, a lamination film of a silicon oxynitride film 401a, manufactured from $SiH_4$, $NH_3$, and $N_2O$ by plasma CVD, and formed having a thickness of 10 to 200 nm (preferably between 50 and 100 nm), and a hydrogenated silicon oxynitride film 401b, similarly manufactured from $SiH_4$ and $N_2O$, and formed having a thickness of 50 to 200 am (preferably between 100 and 150 nm), is formed. A two-layer structure is shown for the base film 401 in Embodiment 1, but a single layer film of the insulating film, and a structure in which more than two layers are laminated, may also be formed.

Island shape semiconductor layers 402 to 406 are formed by crystalline semiconductor films made from a semiconductor film having an amorphous structure, using a laser crystallization method or a known thermal crystallization method. The thickness of the island shape semiconductor layers 402 to 406 may be formed from 25 to 80 nm (preferably between 30 and 60 nm). There are no limitations placed on the materials for forming a crystalline semiconductor film, but it is preferable to form the crystalline semiconductor films by silicon or a silicon germanium (SiGe) alloy.

A laser such as a pulse oscillation type or continuous light emission type excimer laser, a YAG laser, or a $YVO_4$ laser can be used to fabricate the crystalline semiconductor films by the laser crystallization method. A method of condensing laser light emitted from a laser oscillator into a linear shape by an optical system and then irradiating the light to the semiconductor film may be used when these types of lasers are used. The crystallization conditions may be suitably selected by the operator, but when using the excimer laser, the pulse oscillation frequency is set to 30 Hz, and the laser energy density is set form 100 to 400 $mJ/cm^2$ (typically between 200 and 300 $mJ/cm^2$). Further, when using the YAG laser, the second harmonic is used and the pulse oscillation frequency is set from 1 to 10 kHz, and the laser energy density may be set from 300 to 600 $mJ/cm^2$ (typically between 350 and 500 $mJ/cm^2$). The laser light condensed into a linear shape with a width of 100 to 1000 μm, for example 400 μm, is then irradiated over the entire surface of the substrate. This is performed with an overlap ratio of 80 to 98% for the linear laser light.

A gate insulating film 407 is formed covering the island shape semiconductor layers 402 to 406. The gate insulating film 407 is formed of an insulating film containing silicon with a thickness of 40 to 150 nm by plasma CVD or sputtering. A 120 nm thick silicon oxynitride film is formed in Embodiment 1. The gate insulating film is not limited to this type of silicon oxynitride film, of course, and other insulating films containing silicon may also be used in a single layer or in a lamination structure. For example, when using a silicon oxide film, it can be formed by plasma CVD with a mixture of TEOS (tetraethyl orthosilicate) and $O_2$, at a reaction pressure of 40 Pa, with the substrate temperature set from 300 to 400° C., and by discharging at a high frequency (13.56 MHZ) electric power density of 0.5 to 0.8 $W/cm^2$. Good characteristics as a gate insulating film can be obtained by subsequently performing thermal annealing, at between 400 and 500° C., of the silicon oxide film thus manufactured.

A first conductive film 408 and a second conductive film 409 are then formed on the gate insulating film 407 in order to form gate electrodes. The first conductive film 408 is formed of a TaN film with a thickness of 50 to 100 nm, and the second conductive film 409 is formed of a W film having a thickness of 100 to 300 nm, in Embodiment 1.

The W film is formed by sputtering with a W target, which can also be formed by thermal CVD using tungsten hexafluoride ($WF_6$). Whichever is used, it is necessary to make the film become low resistance in order to use it as the gate electrode, and it is preferable that the resistivity of the W film be made equal to or less than 20 μΩcm. The resistivity can be lowered by enlarging the crystal grains of the W film, but for cases in which there are many impurity elements such as oxygen within the W film, crystallization is inhibited, thereby the film becomes high resistance. A W target having a purity of 99.9999% is thus used in sputtering. In addition, by forming the W film while taking sufficient care that no impurities from the gas phase are introduced at the time of film formation, the resistivity of 9 to 20 μΩcm can be achieved.

Note that, although the first conductive film 408 is a TaN film and the second conductive film 409 is a W film in Embodiment 1, both may also be formed from an element selected from the group consisting of Ta, W, Ti, Mo, Al, and Cu, or from an alloy material having one of these elements as its main constituent, and a chemical compound material. Further, a semiconductor film, typically a polycrystalline silicon film into which an impurity element such as phosphorus is doped, may also be used. Examples of preferable combinations other than that used in Embodiment 1 include: forming the first conductive film 408 by tantalum nitride (TaN) and combining it with the second conductive film 409 formed from a W film; forming the first conductive film 408 by tantalum nitride (TaN) and combining it with the second conductive film 409 formed from an Al film; and forming the first conductive film 408 by tantalum nitride (TaN) and combining it with the second conductive film 409 formed from a Cu film.

Then, masks 410 to 415 are formed from resist, and a first etching treatment is performed in order to form electrodes and wirings. An ICP (inductively coupled plasma) etching method is used in Embodiment 1. An etching gas is mixed, and a plasma is generated by applying a 500 W RF electric power (13.56 MHZ) to a coil shape electrode at 1 Pa. A 100 W RF electric power (13.56 MHZ) is also applied to the substrate side (test piece stage), effectively applying a negative self-bias voltage. By the etching gas is selected appropriately, the W film and the Ta film are etched to the approximately same level.

Edge portions of the first conductive layer and the second conductive layer are made into a tapered shape in accordance with the effect of the bias voltage applied to the substrate side under the above etching conditions by using a suitable resist mask shape. The angle of the tapered portions is from 15 to 45°. The etching time may be increased by approximately 10 to 20% in order to perform etching without any residue remaining on the gate insulating film. The selectivity of a silicon oxynitride film with respect to a W film is from 2 to 4 (typically 3), and therefore approximately 20 to 50 am of the exposed surface of the silicon oxynitride film is etched by this over-etching process. First shape conductive layers 417 to 422 (first conductive layers 417a to 422a and second conductive layers 417b to 422b) are thus formed of the first conductive layers and the second conductive layers in accordance with the first etching process. Reference numeral 416 denotes a gate insulating film, and the regions not covered by the first shape conductive layers 417 to 422 are made thinner by etching of about 20 to 50 nm.

A first doping process is then performed, and an impurity element which imparts n-type conductivity is added. Ion doping or ion injection may be performed for the method of doping. Ion doping is performed under the conditions of a dose amount of from $1\times10^{13}$ to $5\times10^{14}$ atoms/cm$^2$ and an acceleration voltage of 60 to 100 keV. A periodic table group 15 element, typically phosphorus (P) or arsenic (As) is used as the impurity element which imparts n-type conductivity, and phosphorus (P) is used here. The conductive layers 417 to 420 become masks with respect to the n-type conductivity imparting impurity element in this case, and first impurity regions 423 to 426 are formed in a self-aligning manner. The impurity element which imparts n-type conductivity is added to the first impurity regions 423 to 426 with a concentration in the range of $1\times10^{20}$ to $1\times10^{21}$ atoms/cm$^3$. (FIG. 21B) Second etching treatment is then conducted as shown in FIG. 21C. In this etching treatment, ICP etching is employed, a reaction gas is introduced to chambers, and plasma is generated by giving RF (13.56 MHz) power of 500 W to a coiled electrode at a pressure of 1 Pa. RF (13.56 MHz) power of 50 W is also given to the substrate side (sample stage) so that a self-bias voltage lower than that of the first etching treatment can be applied. The W film is subjected to anisotropic etching and the second shape conductive films 427 to 432 are obtained.

A second doping process is then performed, as shown in FIG. 21C. The dose amount is smaller than that of the first doping process in this case, and an impurity element which imparts n-type conductivity is doped under high acceleration voltage conditions. For example, doping performed with the acceleration voltage set from 70 to 120 keV, and a dose amount of $1\times10^{13}$ atoms/cm$^3$, and a new impurity region is formed inside the first impurity region is formed inside the first impurity region formed in the island shape semiconductor layers of FIG. 21B. The second conductive layers 427 to 433 are used as masks with respect to the impurity element, and doping is performed so as to also add the impurity element into regions under the first conductive layers 427a to 433a. The second impurity regions 433 to 437, which is overlapped with the first conductive layer 427a to 430a is formed. The impurity elements which imparts an n-type conductivity is made its concentration range of $1\times10^{17}$ to $1\times10^{18}$ atoms/cm$^3$ in the second impurity region.

By etching the gate insulating film 416, TaN which is the first conductive layer is backward by the etching simultaneously, so that there are formed third conductive layers 438 through 443 (first conductive layers 438a to 443a and second conductive layers 438b to 443b). Reference numeral 444 denotes a gate insulating film, and regions not covered by the third shape conductive layers 438 to 443 are additionally etched on the order of 20 to 50 nm, forming thinner regions.

By the third etching, there are formed third impurity regions 445 to 449 overlapping the first conductive layers 438a to 441a and the forth impurity regions 450 to 454 at the external of the third impurity region as shown in FIG. 22A. Thus, the concentration of the impurity elements imparting an n-type conductivity in the third impurity region and the forth impurity region is as same as that in the second impurity region.

Fourth impurity regions 458 to 461 added with an impurity element having a conductivity type which is the opposite of a conductivity type impurity element, are then formed as shown in FIG. 22B in the island shape semiconductor layers 403, 406 which form p-channel TFTs. The third shaped conductive layers 439, 441 is used as a mask with respect to the impurity element, and the impurity regions are formed in a self-aligning manner. The island shape semiconductor films 402, 404, 405 which form n-channel TFTs, are covered over their entire surface areas by resist masks 455 to 457. Phosphorus is added to the impurity regions 458 to 461 at a different concentration, and ion doping is performed here using diborane (B$_2$H$_6$), so that the respective impurity regions have the impurity concentration of $2\times10^{20}$ to $2\times10^{21}$ atoms/cm$^3$.

Impurity regions are formed in the respective island shape semiconductor layers by the above processes. The conductive layers (the conductive layers forming the gate electrode) 438 to 441 overlapping the island shape semiconductor layers function as gate electrodes. The reference numeral 442 functions as a source wiring and 443 functions as a wiring in the driver circuit.

A process of activating the impurity elements added to the respective island shape semiconductor layers is then performed with the aim of controlling conductivity type as shown in FIG. 22C. Thermal annealing using an annealing furnace is performed for this process. In addition, laser annealing and rapid thermal annealing (RTA) can also be applied. Thermal annealing is performed with an oxygen concentration equal to or less than 1 ppm, preferably equal to or less than 0.1 ppm, in a nitrogen atmosphere at 400 to 700° C., typically between 500 and 600° C. Heat treatment is performed for 4 hours at 500° C. in Embodiment 1. However, for cases in which the wiring material used in the third conductive layers 438 to 443 is weak with respect to heat, it is preferable to perform activation after forming an interlayer insulating film (having silicon as its main constituent) in order to protect the wirings and the like.

In addition, heat treatment is performed for 1 to 12 hours at 300 to 450° C. in an atmosphere containing between 3 and 100% hydrogen, performing hydrogenation of the island shape semiconductor layers. This process is one of terminating dangling bonds in the island shape semiconductor layers by hydrogen which is thermally excited. Plasma hydrogenation (using hydrogen excited by a plasma) may also be performed as another means of hydrogenation.

Figures 23, 24:
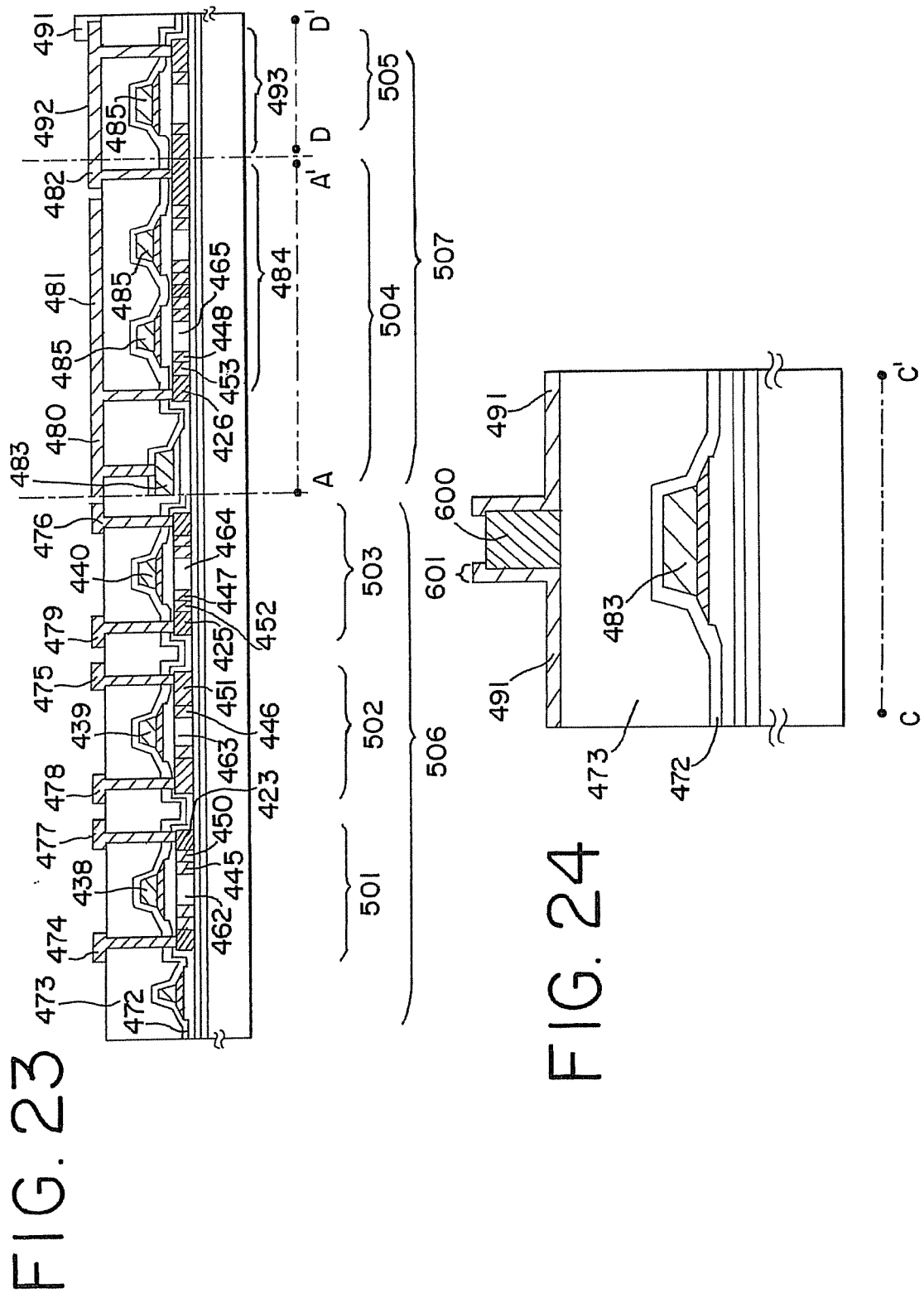
FIG. 23 is a cross sectional diagram showing the process of manufacturing an active matrix substrate (Embodiment 1)
FIG. 24 is a cross sectional diagram showing the process of manufacturing an active matrix substrate (Embodiment 1)

A first interlayer insulating film 472 is then formed from a silicon oxynitride film having a thickness of 100 to 200 nm, as shown in FIG. 23. An acrylic resin film or a polyimide resin film is then formed with a thickness of 1.8 μm on the first interlayer insulating film 472 as a second interlayer insulating film 473. An etching process is performed next in order to form contact holes.

A conductive metallic film is then formed by sputtering or vacuum evaporation. A Ti film having a thickness of 50 to 150 μm is formed, contacts with the semiconductor layers forming source regions or drain regions of the island shape semiconductor films, an aluminum (Al) film is formed having a thickness of 300 to 400 nm on the Ti film, and in addition, a Ti film or a titanium nitride (TiN) film is formed having a thickness of 100 to 200 nm, resulting in a three layer structure.

Source wirings 474 to 476 for forming contacts with the source regions of the island shape semiconductor film in the driver circuit portion, and drain wirings 477 to 479 for forming contacts with the drain regions, are then formed.

Further, a connection electrode 480, a gate wiring 481, a drain electrode 482, and an electrode 492 are formed in the pixel portion.

The connection electrode 480 electrically connects a source wiring 483 and a first semiconductor film 484. Although not shown in the figures, the gate wiring 481 is electrically connected to a conductive layer 485 forming a gate electrode, through a contact hole. The drain electrode 482 is electrically connected to a drain region of the first semiconductor film 484. The electrode 492 is electrically connected to a second semiconductor film 493, and the second semiconductor layer 493 functions as an electrode of a storage capacitor 505.

Next, as shown in FIG. 24, a photolithography process is performed using a photosensitive resin film, and a convex portion 600 is formed having a thickness of 0.32 μm on the source wiring 483. As a photosensitive resin film, a material in which JSR Corporation product BPR-107VL is diluted by PGNEA (propylene glycol monomethyl ether acetate), reducing its viscosity, is used. In the upper surface diagram of the pixel portion, the convex portion is patterned into a thin, long rectangular shape and the width of its minor axis is set to 4.0 μm.

A transparent conductive film is then formed over the entire surface, as shown in FIG. 23 and FIG. 24, and a pixel electrode 491 is formed by a patterning process and an etching process using a photomask. The pixel electrode 491 is formed on the second interlayer insulating film 473, and portions overlapping with the drain electrode 482 and the electrode 492 of the pixel TFT are formed, forming a connective structure. The width of a first region 601 of the pixel electrode 491 formed in the upper edge portion of the convex portion is set to be 1.0 μm.

The transparent conductive film can be formed by a method such as sputtering or vacuum evaporation using a material such as indium oxide ($In_2O_3$), or an alloy of indium oxide and tin oxide ($In_2O_3$—$SnO_2$; ITO). The etching process for this type of material may be performed by a hydrochloric acid solution. However, residue easily develops with etching of ITO in particular, and therefore an alloy of indium oxide and zinc oxide ($In_2O_3$—ZnO) may also be used in order to improve the etching workability. The indium oxide and zinc oxide alloy has superior surface smoothness, and is also superior to ITO in its thermal stability, and therefore a corrosive reaction with AL contacting at the edge surfaces of the drain electrode 482 can be prevented. Similarly, zinc oxide (ZnO) is also a suitable material, and in addition, a material such as zinc oxide to which gallium (Ga) is added (ZnO:Ga) in order to increase the optical light transmittivity and the conductivity can also be used.

An active matrix substrate corresponding to a transmission type liquid crystal display device can thus be completed.

A driver circuit portion having an n-channel TFT 501, a p-channel TFT 502, and an n-channel TFT 503, and a pixel portion having a pixel TFT 504 and a storage capacitor 505 can thus be formed on the same substrate. This type of substrate is referred to as an active matrix substrate in this specification, for convenience. (See FIG. 23.)

The n-channel TFT 501 of the driver circuit portion has the channel forming region 462, the third impurity region 445 (GOLD region) overlapping with the conductive layer 438 forming a gate electrode, the fourth impurity region 450 (LDD region) formed on the outside of the gate electrode, and the first impurity region 423 which functions as a source region or a drain region. The p-channel TFT 502 has the channel forming region 463, the fifth impurity region 446 overlapping with the conductive layer 439 forming a gate electrode, and the sixth impurity region 451 which functions as a source region or a drain region. The n-channel TFT 503 has the channel forming region 464, the third impurity region 447 (GOLD region) which overlaps with the conductive layer 440 forming a gate electrode, the fourth impurity region 452 (LDD region) formed on the outside of the gate electrode, and the first impurity region 425 which functions as a source region or a drain region.

The pixel TFT 504 of the pixel portion has the channel forming region 465, the third impurity region 448 (GOLD region) which overlaps with the conductive layer 485 forming a gate electrode, the fourth impurity region 453 (LDD region) formed on the outside of the gate electrode, and the first impurity region 426 which functions as source region or a drain region. Further, an impurity element imparting p-type conductivity is added to the semiconductor film 493, which functions as one electrode of the storage capacitor 505. The storage capacitor is formed by the semiconductor layer 485, which forms the gate electrode, and an insulating layer (the same layer as the gate insulating film) formed therebetween.

Figure 25:
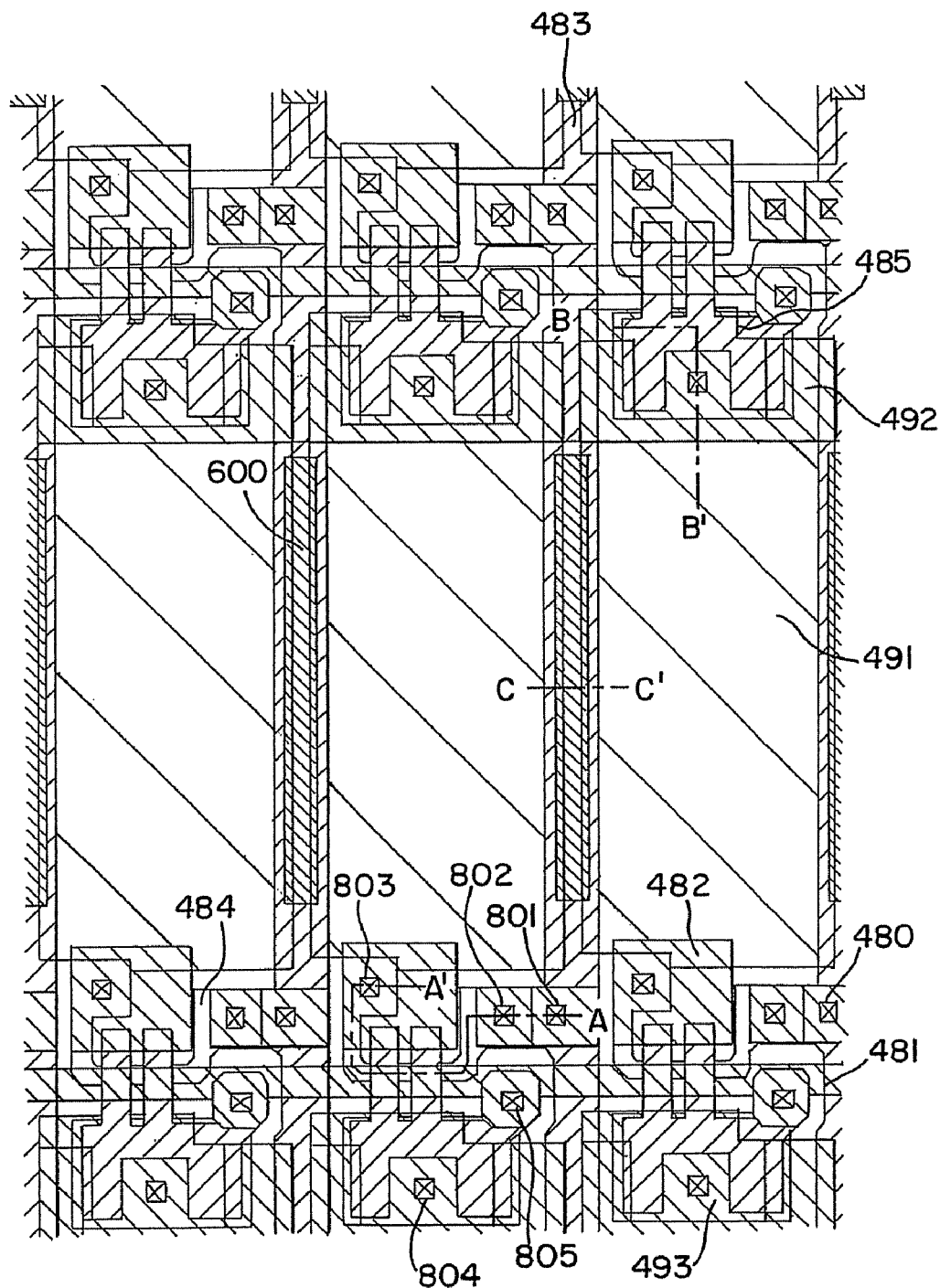
FIG. 25 is an upper surface diagram showing a pixel portion of an active matrix substrate (Embodiment 1)

Cross sections in which the upper surface diagram of FIG. 25 is cut along the dashed line A-A' and the dashed line B-B' correspond to the cross sections in which FIG. 23 is cut along the dashed line A-A' and the dashed line B-B'. A cross section in which the upper surface diagram of FIG. 25 is cut along the dashed line C-C' corresponds to the cross section in which FIG. 24 is cut along the dashed line C-C'. Reference numerals 801 to 805 of FIG. 25 denote contact holes.

The convex portion formed on the source line in the upper surface diagram of FIG. 25 is made into a rectangular island shape. However, it is also possible to use a stripe shape in which the pixel portions of adjacent pixels are mutually connected.

Embodiment 2

A portion of the method of manufacturing the active matrix substrate manufactured by Embodiment 1 can be applied to a reflection type liquid crystal display device.

Processing is first performed in accordance with FIGS. 21A to 22C of Embodiment 1.

The first interlayer insulating film 472 is then formed from a silicon oxynitride film having a thickness of 100 to 200 nm, as shown in FIG. 27. An acrylic resin film or a polyimide film is then formed with a thickness of 1.8 μm on the first interlayer insulating film 472 as the second interlayer insulating film 473. An etching process is performed next in order to form contact holes.

Figure 28:
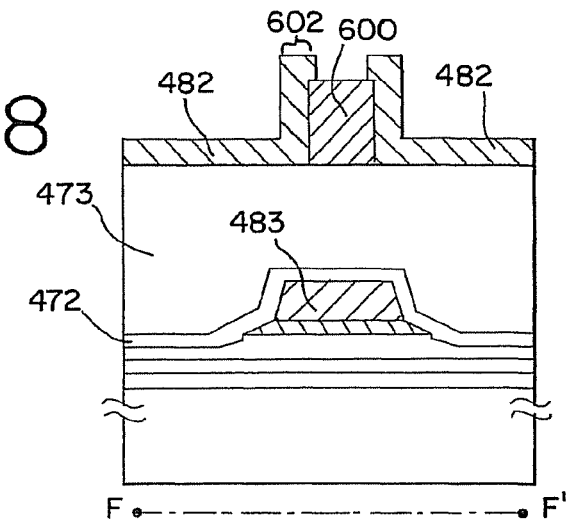
FIG. 28 is a cross sectional diagram showing the process of manufacturing an active matrix substrate Embodiment 2)

Next, as shown in FIG. 28, a photolithography process is performed using a photosensitive resin film, and the convex portion 600 is formed having a thickness of 0.32 μm on the source wiring 483. A material in which JSR Corporation product BPR-107VL is diluted by PGMEA (propylene glycol monomethyl ether acetate), reducing its viscosity, is used.

A conductive metallic film is then formed by sputtering or vacuum evaporation, as shown in FIGS. 27 and 28. A Ti film having a thickness of 50 to 150 μm is formed, contacts with the semiconductor layers forming source regions or drain regions of the island shape semiconductor films, an aluminum (Al) film is formed to have a thickness of 300 to 400 nm on the Ti film, and in addition, a Ti film or a titanium nitride (TiN) film is formed to have a thickness of 100 to 200 nm, resulting in a three layer structure.

The source wirings 474 to 476 for forming contacts with the source regions of the island shape semiconductor film in the driver circuit portion, and the drain wirings 477 to 479 for forming contacts with the drain regions, are then formed.

Further, the connection electrode 480, the gate wiring 481, and the drain electrode 482 are formed in the pixel portion. The drain electrode 482 has a function as a pixel electrode of the reflecting liquid crystal display device in Embodiment 2. Note that, as shown in FIG. 28, the upper edge portion of the convex portion and the drain electrode 482 mutually overlap. The width of a first region 602 of the drain electrode is set to 1.5 μm.

The connection electrode 480 electrically connects the source wiring 483 and the first semiconductor film 484. Although not shown in the figures, the gate wiring 481 electrically connects to the conductive layer 485 forming a gate electrode, through a contact hole. The drain electrode 482 electrically connects to a drain region of the first semiconductor film 484. In addition, the drain electrode 482 is electrically connected to the first semiconductor film 493, and the second semiconductor film 493 functions as an electrode of the storage capacitor 505.

The second semiconductor films 493 formed in each pixel, and the conductive layers 485 forming the gate electrodes are made into electrodes of the storage capacitor. The gate insulating film 444 functions as a dielectric film of the storage capacitor. The second semiconductor film 493 becomes the same electric potential as the drain electrode 482. The semiconductor layer 485 becomes the same electric potential as the gate wiring.

An active matrix substrate corresponding to a reflection type liquid crystal display device can thus be completed.

A driver circuit portion having the n-channel TFT 501, the p-channel TFT 502, and the n-channel TFT 503, and a pixel portion having the pixel TFT 504 and the storage capacitor 505 can thus be formed on the same substrate. This type of substrate is referred to as an active matrix substrate within this specification, for convenience.

The n-channel TFT 501 of the driver circuit portion has the channel forming region 462, the third impurity region 445 (GOLD region) overlapping with the conductive layer 438 forming a gate electrode, the fourth impurity region 450 (LDD region) formed on the outside of the gate electrode, and the first impurity region 423 which functions as a source region or a drain region. The p-channel TFT 502 has the channel forming region 463, the fifth impurity region 446 overlapping with the conductive layer 439 forming a gate electrode, and the sixth impurity region 451 which functions as a source region or a drain region. The n-channel TFT 503 has the channel forming region 464, the third impurity region 447 (GOLD region) which overlaps with the conductive layer 440 forming a gate electrode, the fourth impurity region 452 (LDD region) formed on the outside of the gate electrode, and the first impurity region 425 which functions as a source region or a drain region.

The pixel TFT 504 of the pixel portion has the channel forming region 465, the third impurity region 448 (GOLD region) which overlaps with the conductive layer 485 forming a gate electrode, the fourth impurity region 453 (LDD region) formed on the outside of the gate electrode, and the first impurity region 426 which functions as sweet area source region or a drain region. Further, an impurity element imparting p-type conductivity is added to the semiconductor film 493, which functions as one electrode of the storage capacitor 505. The storage capacitor is formed by the semiconductor layer 485, which forms the gate electrode, and an insulating layer (the same layer as the gate insulating film) formed in between.

Figure 29:
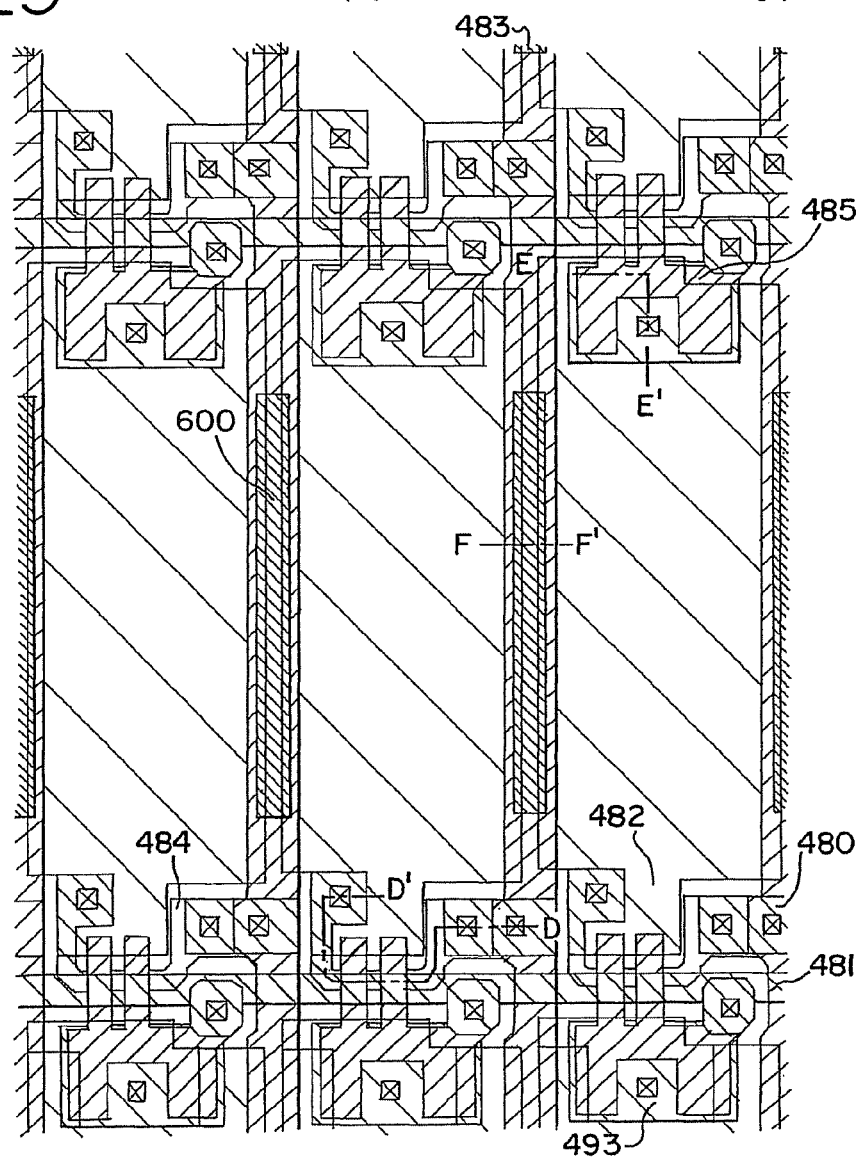
FIG. 29 is an upper surface diagram showing a pixel portion of an active matrix substrate (Embodiment 2)

Cross sections taken along the dashed line D-D' and the dashed line E-E' in a top view of FIG. 29 correspond to the cross sections taken along the dashed line D-D' and the dashed line E-E' in FIG. 27, respectively. A cross section taken along the dashed line F-F' in the top view of FIG. 29 corresponds to the cross section in which FIG. 28 is cut along the dashed line F-F.

Embodiment 3

In this embodiment, the manufacturing process of an active matrix liquid crystal display device from the active matrix substrate manufactured in Embodiment 1 is described below. FIG. 26 is used for explanation.

First, in accordance with Embodiment 1, the active matrix substrate is obtained. FIG. 26 shows a cross-sectional view taken along the line A-A' and C-C' of the pixel portion of the active matrix substrate shown in FIG. 25. In an active matrix substrate, the driver circuit portion 506 and the pixel portion 507 are formed.

First, an orientation film 512 is formed on the active matrix substrate, and is subjected to a rubbing process. Note that, in this embodiment, before the formation of the orientation film 512, a columnar spacer for maintaining a gap between the substrates is formed at a desired position by patterning an organic resin film such as an acrylic resin film. The columnar spacer having 4.0 μm height is used in this embodiment. Further, spherical spacers may be scattered on the entire surface of the substrate in place of the columnar spacer.

Next, an opposing substrate 508 is prepared. On the opposing substrate 508, there are formed a colored layers, a light shielding layer and color filters arranged to correspond to the respective pixels. Further, the driver circuit portion is also provided with a light-shielding layer. A leveling film is provided to cover the color filters and the light-shielding layer. Next, in the pixel portion an opposing electrode 510 is formed from a transparent conductive film on the leveling film, an orientation film 511 is formed on the entire surface of the opposing substrate, and a rubbing process is conducted thereon.

Then, the active matrix substrate on which a pixel portion and a driver circuit are formed is stuck with the opposing substrate by a sealing agent 513. A filler is mixed in the sealing agent 513, and the two substrates are stuck with each other while keeping a uniform gap by this filler and the columnar spacer. Thereafter, a liquid crystal material 514 is injected between both the substrates to encapsulate the substrates completely by an encapsulant (not shown). A known liquid crystal material may be used as the liquid crystal material 514. Thus, the active matrix liquid crystal display device shown in FIG. 26 is completed. Then, if necessary, the active matrix substrate and the opposing substrate are parted into desired shapes. In addition, by using a known technique, a phase difference plate, a polarizing plate or the like may be suitably provided. Then, an FPC is stuck with the substrate using a known technique.

Thus, the liquid crystal display panel manufactured according to above-mentioned steps can be used as a display portion of various electronic devices.

This embodiment can be combined with Embodiment 2.

Figure 1A:
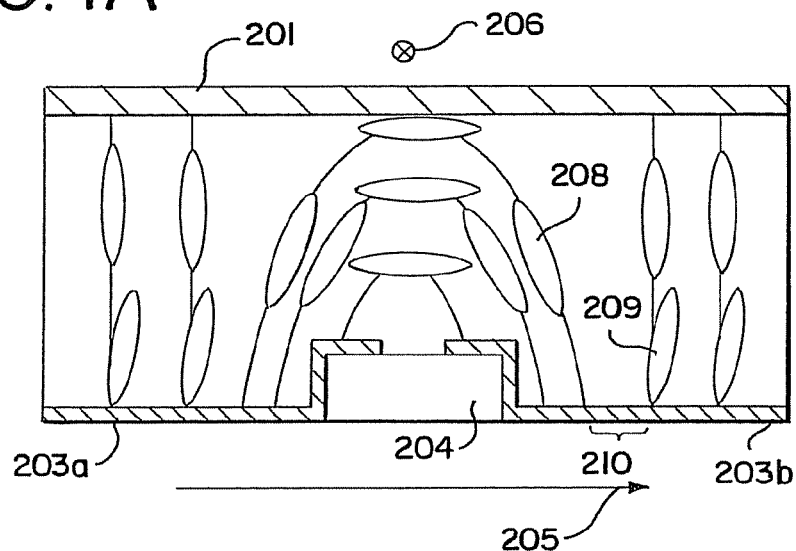
FIGS. 1A to 1C are cross sectional diagrams showing the principles of the present invention.
Figure 1B:
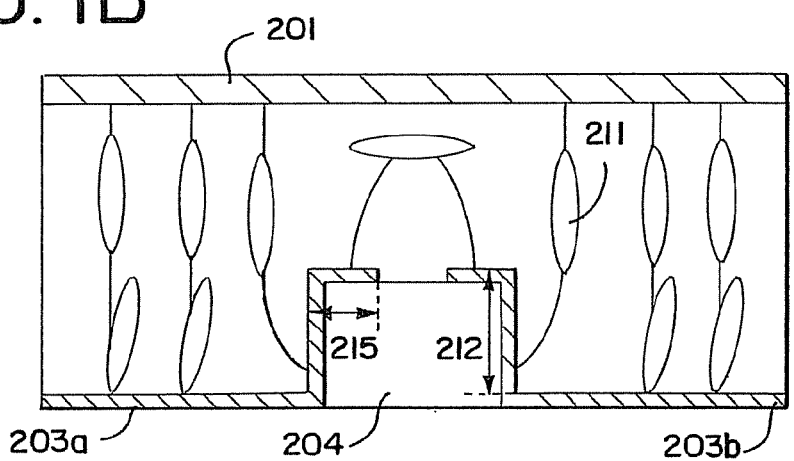
Figure 1C:
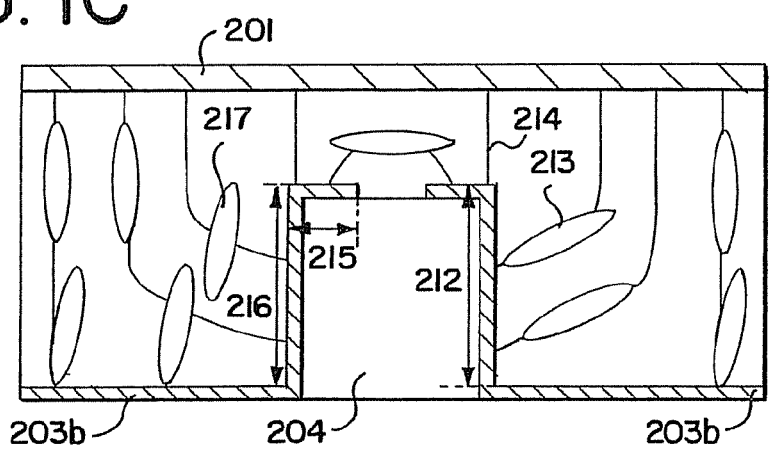
Figure 3:
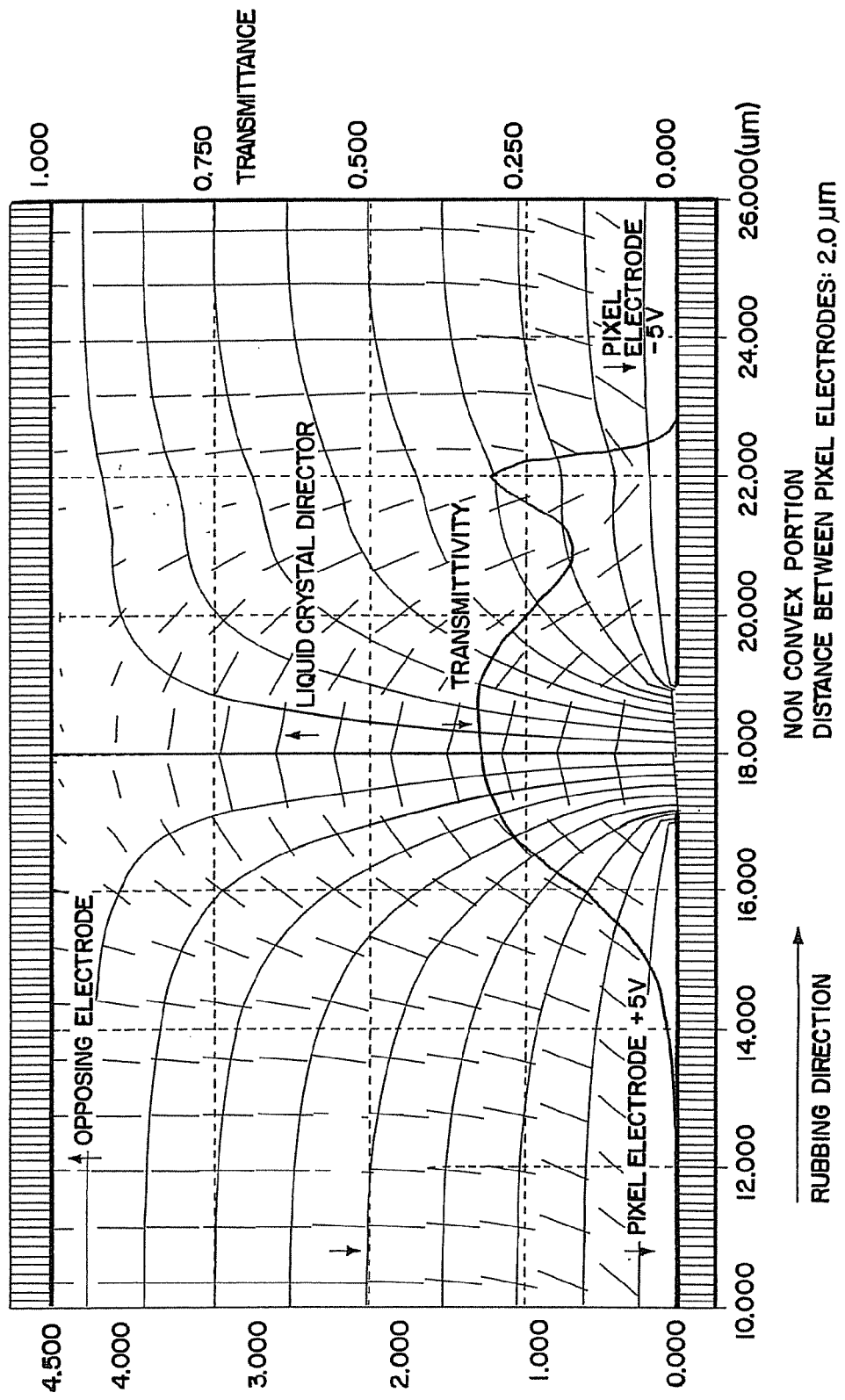
FIG. 3 is a cross sectional diagram showing simulation results when there is no convex portion.
Figure 4:
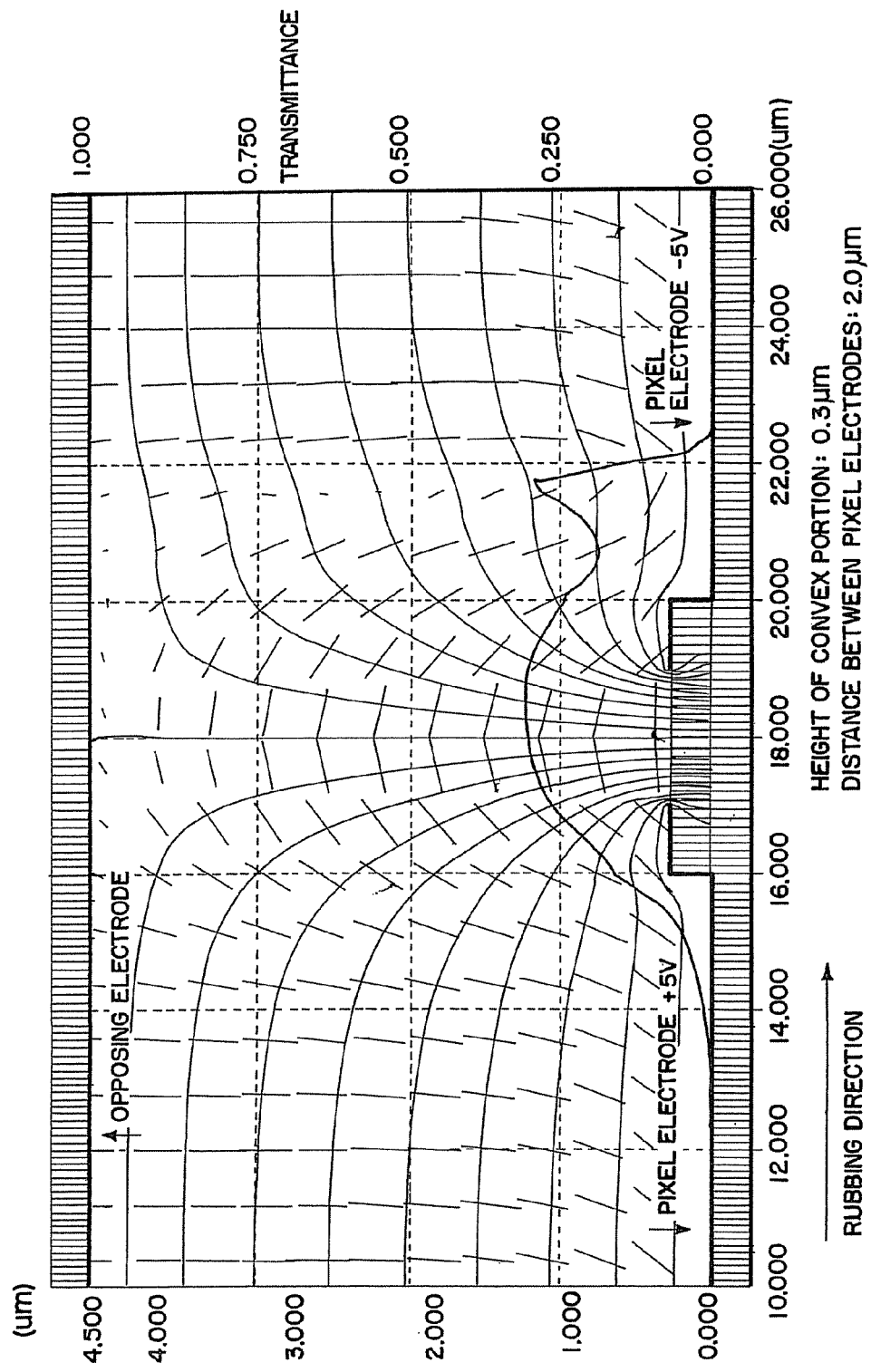
FIG. 4 is a cross sectional diagram showing simulation results when there is a convex portion having a height of 0.3 µm.
Figure 5:
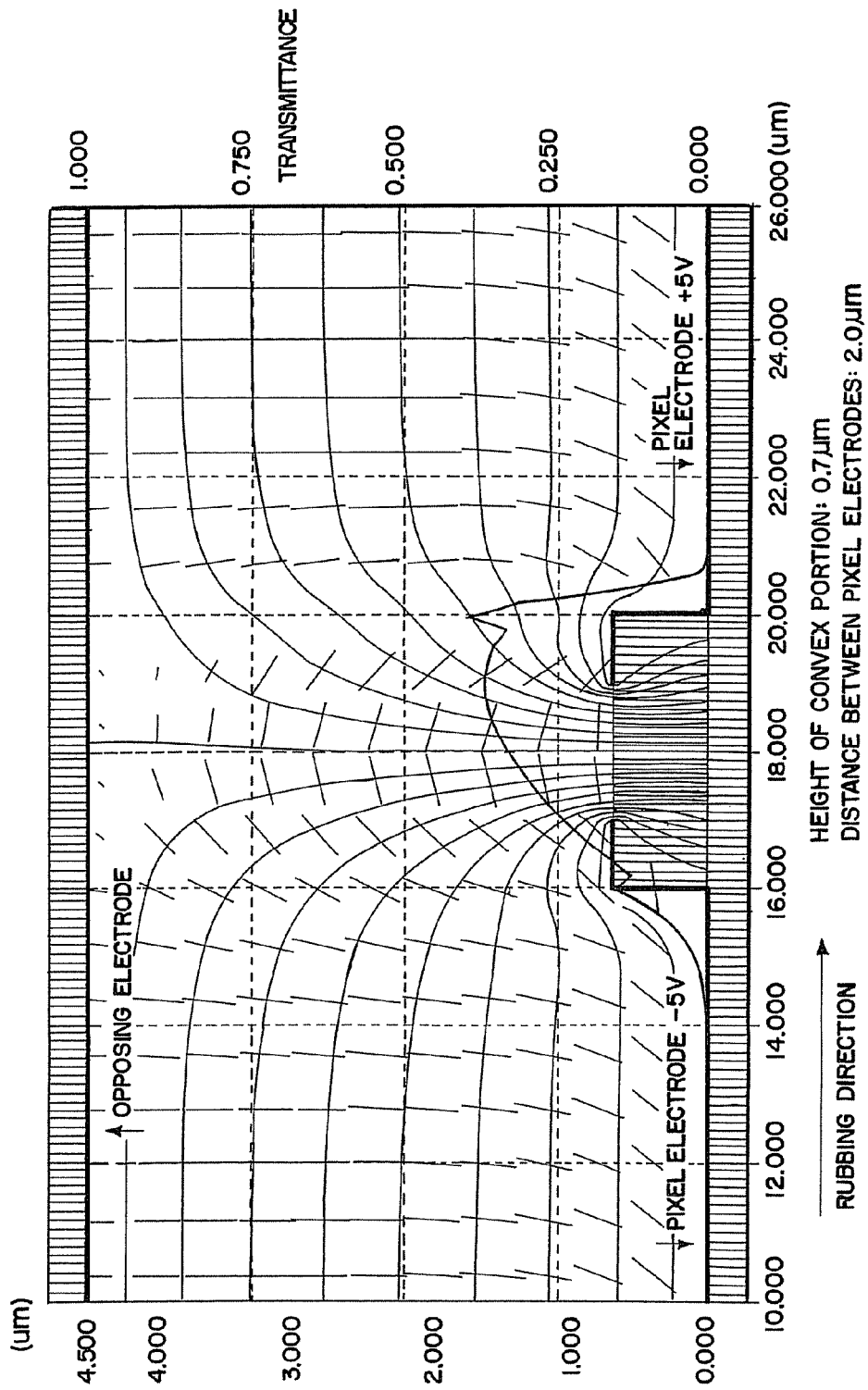
FIG. 5 is a cross sectional diagram showing simulation results when there is a convex portion having a height of 0.7 µm.
Figure 6:
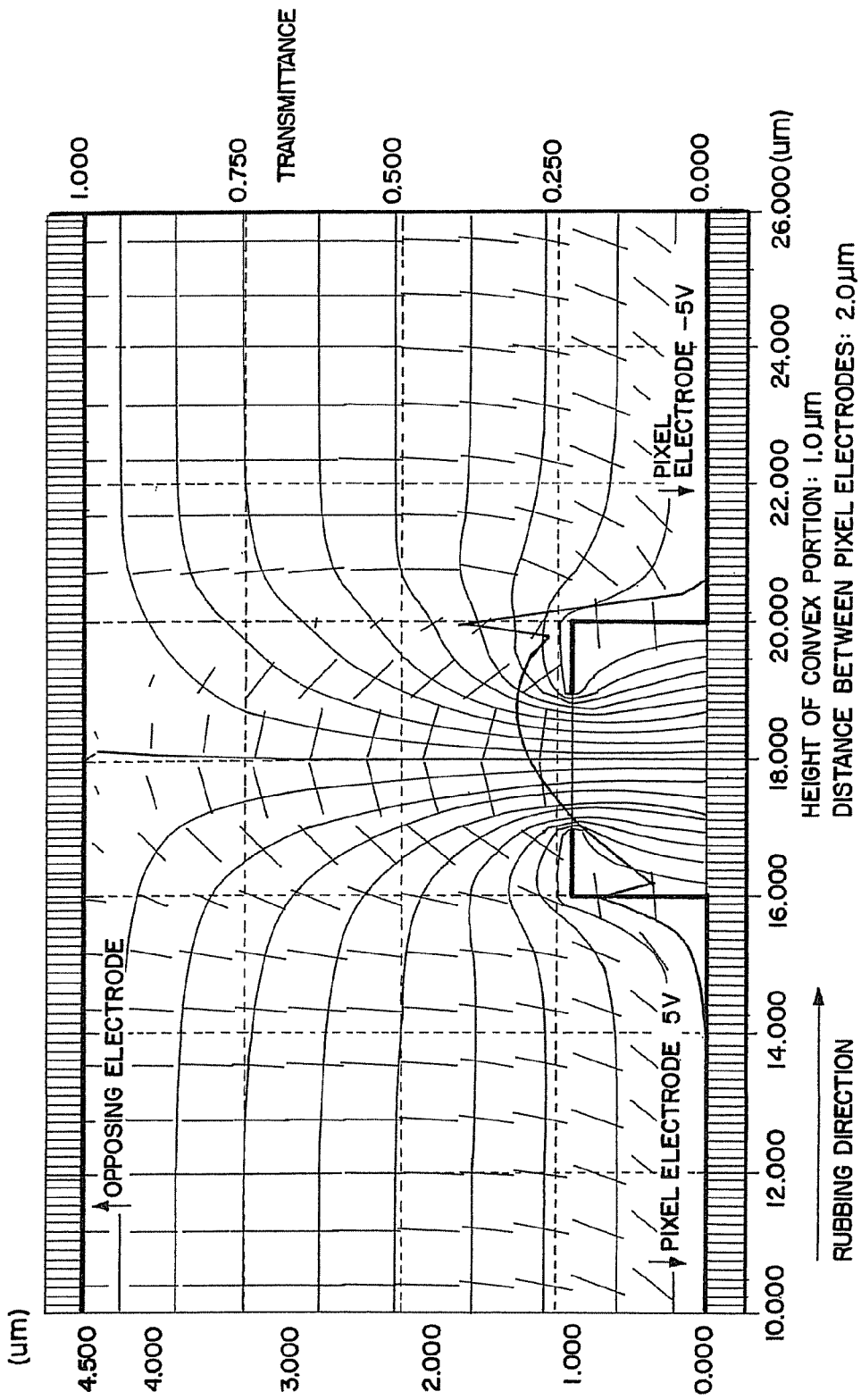
FIG. 6 is a cross sectional diagram showing simulation results when there is a convex 5 portion having a height of 1.0 µm.
Figure 7:
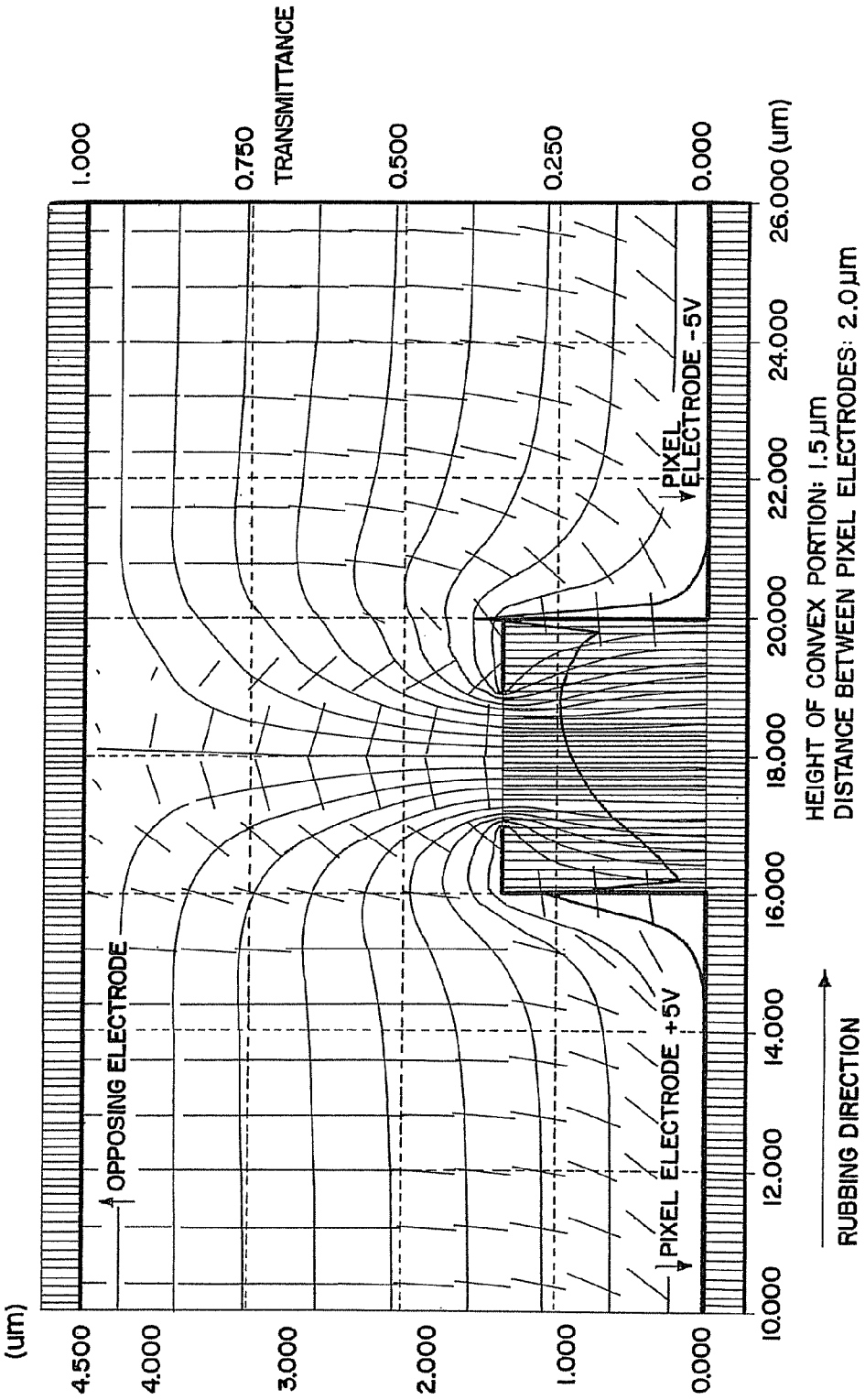
FIG. 7 is a cross sectional diagram showing simulation results when there is a convex portion having a height of 1.5 µm.
Figure 8:
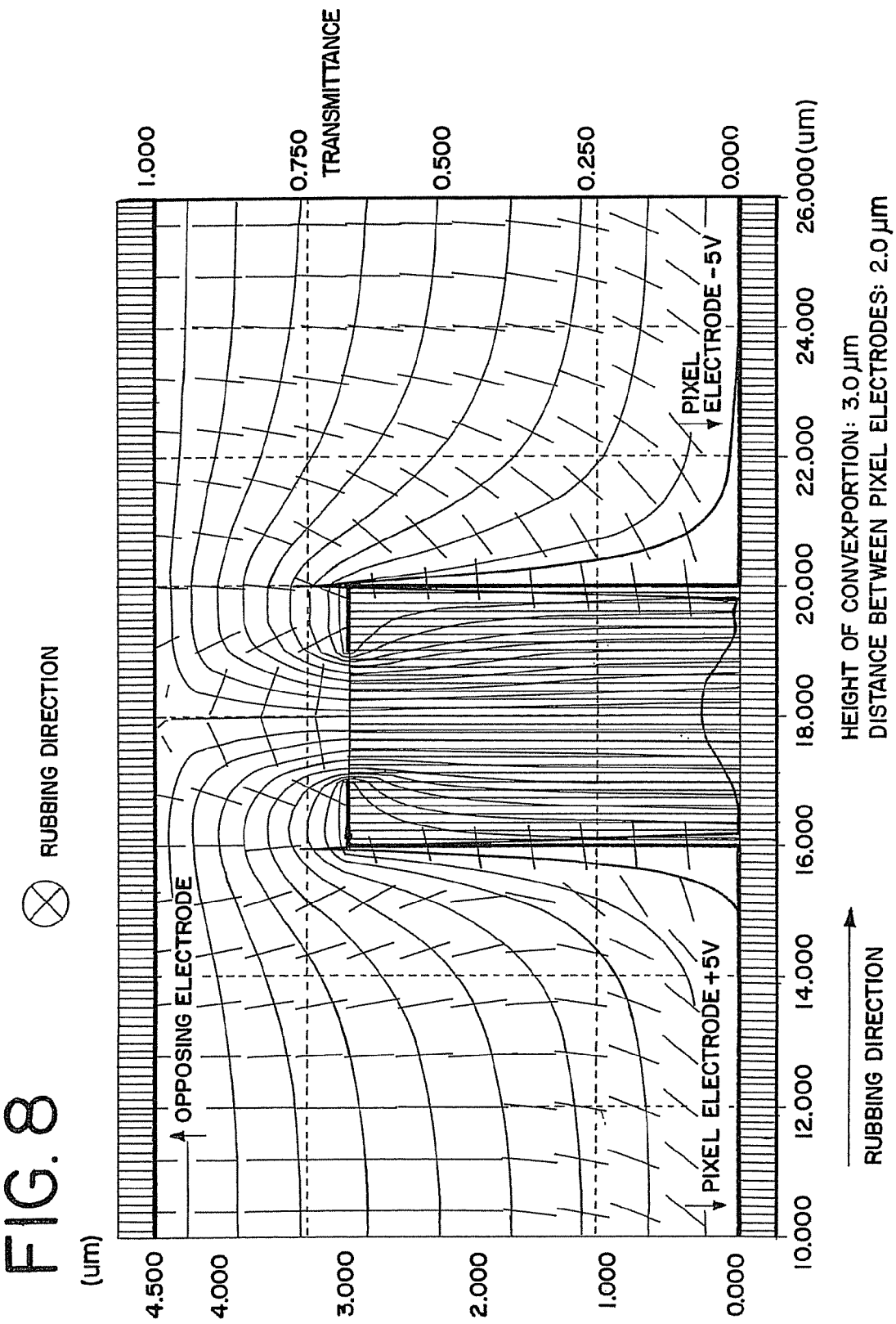
FIG. 8 is a cross sectional diagram showing simulation results when there is a convex portion having a height of 3.0 µm.
Figure 9:
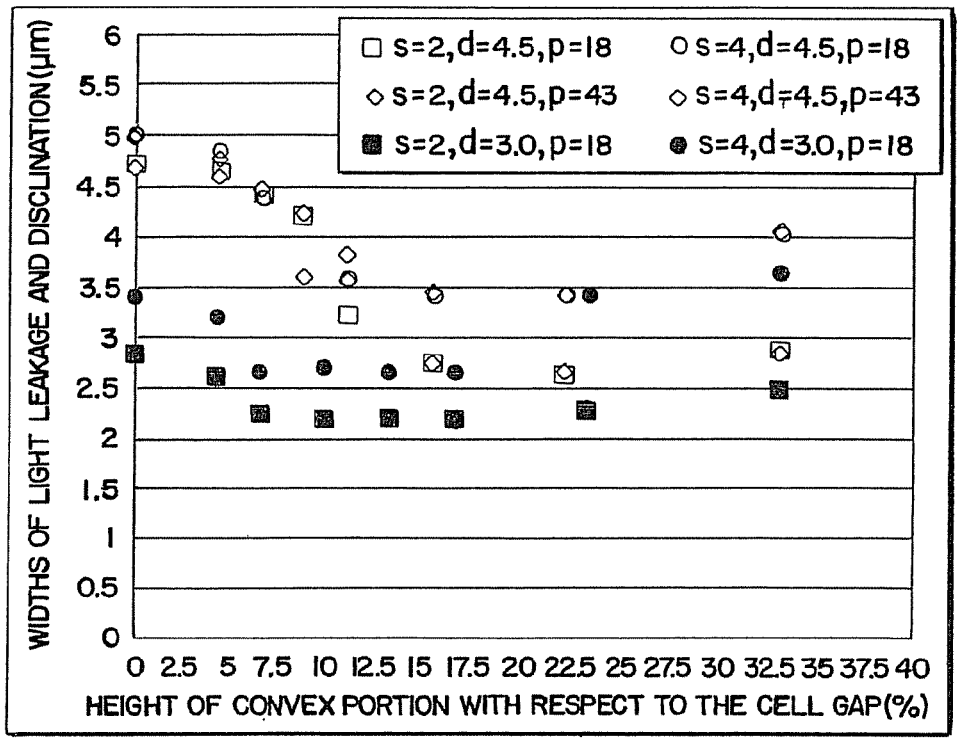
FIG. 9 is a diagram showing the relationship between: the height of a convex portion with respect to a cell gap; and the amount of light leakage and the width of disclination.
Figure 10:
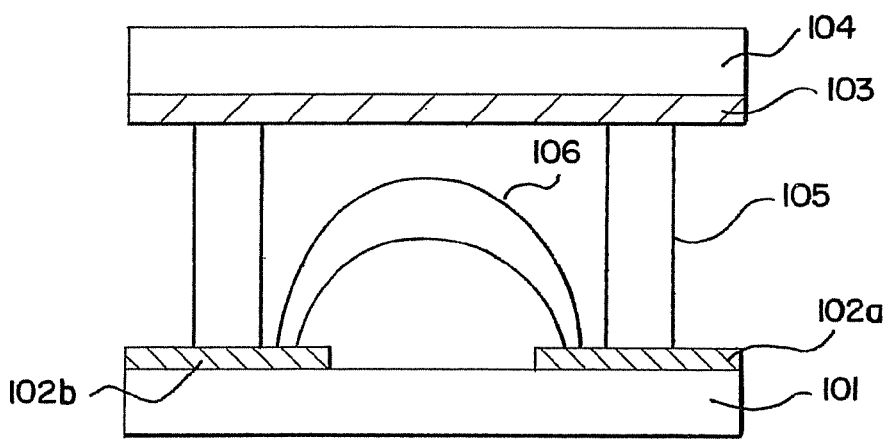
FIG. 10 is a cross sectional diagram showing the definition of a horizontal direction electric field and a vertical direction electric field.
Figure 11:
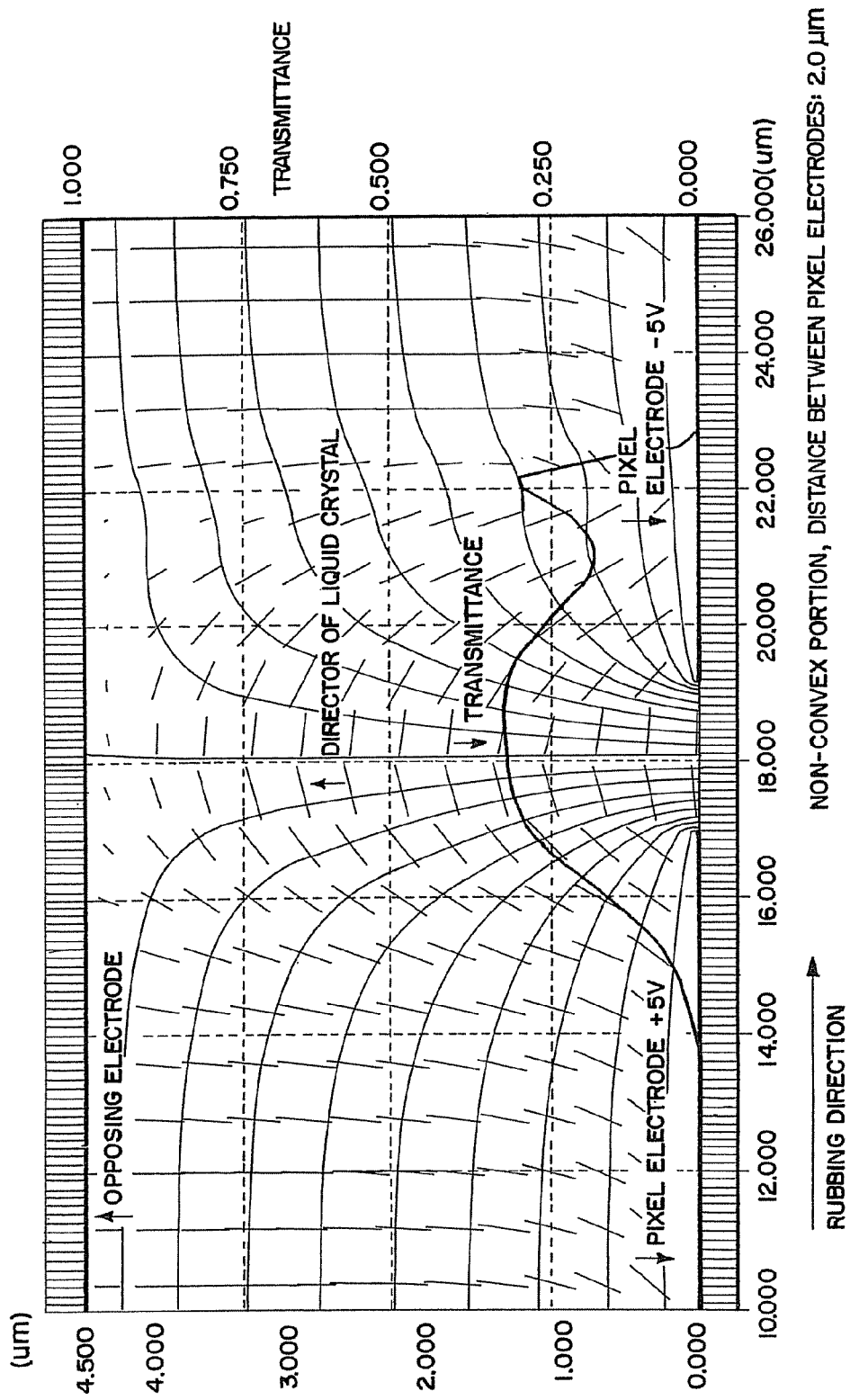
FIG. 11 is a cross sectional diagram showing simulation results when there is no convex portion.
Figure 12:
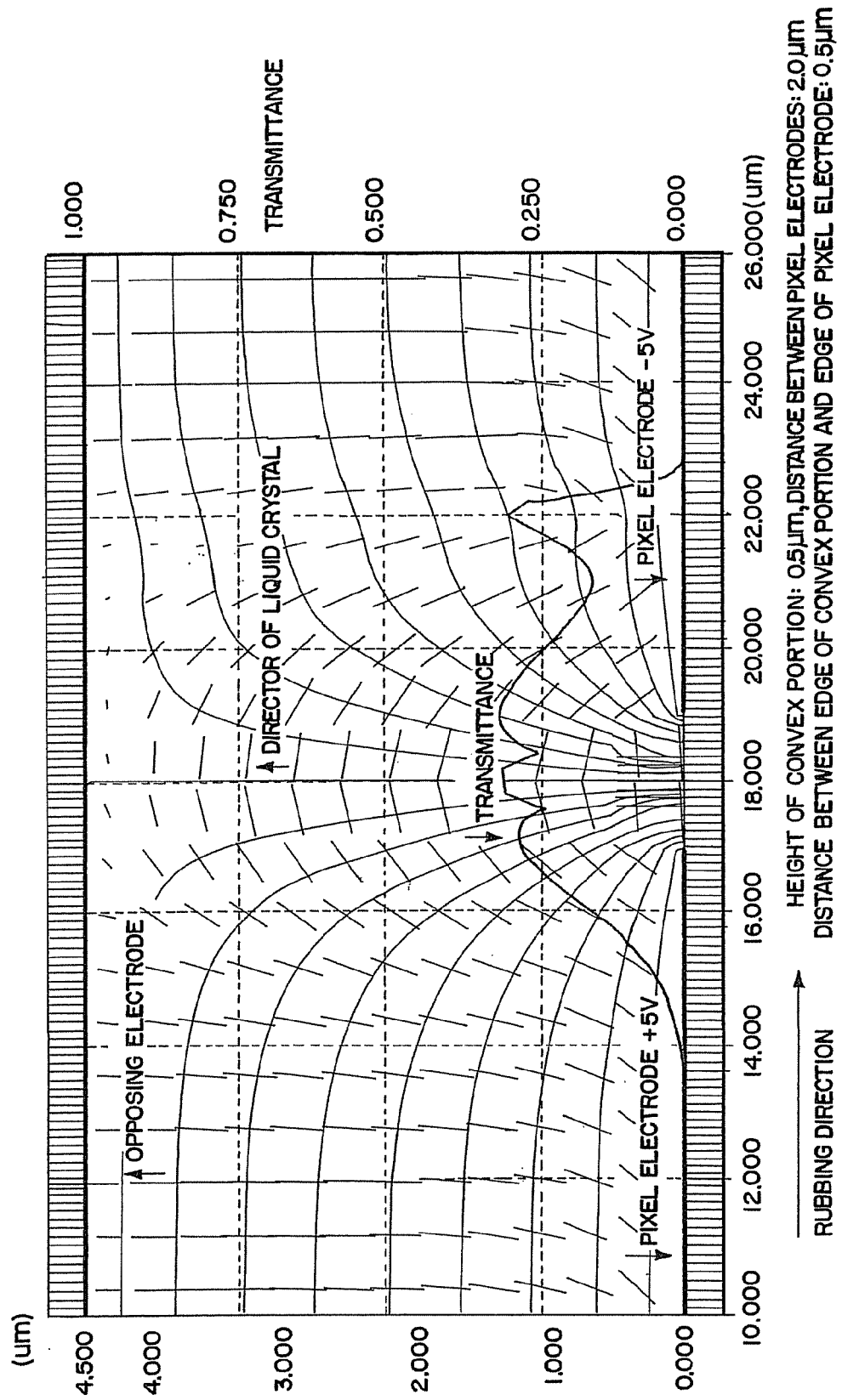
FIG. 12 is a cross sectional diagram showing simulation results when a pixel electrode does not overlap with a convex portion.
Figure 13:
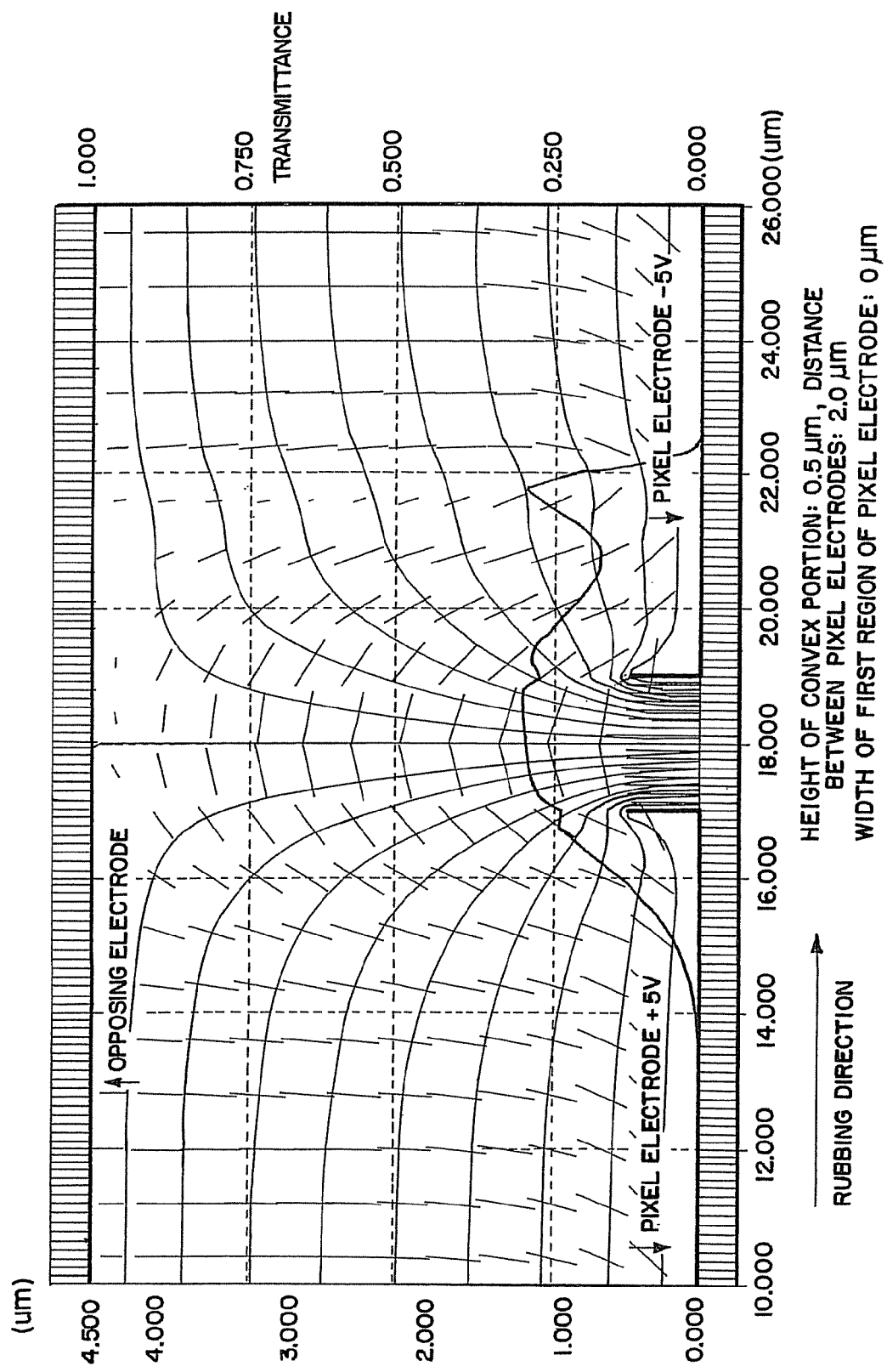
FIG. 13 is a cross sectional diagram showing simulation results when there is a pixel electrode on a side portion of a convex portion.
Figure 14:
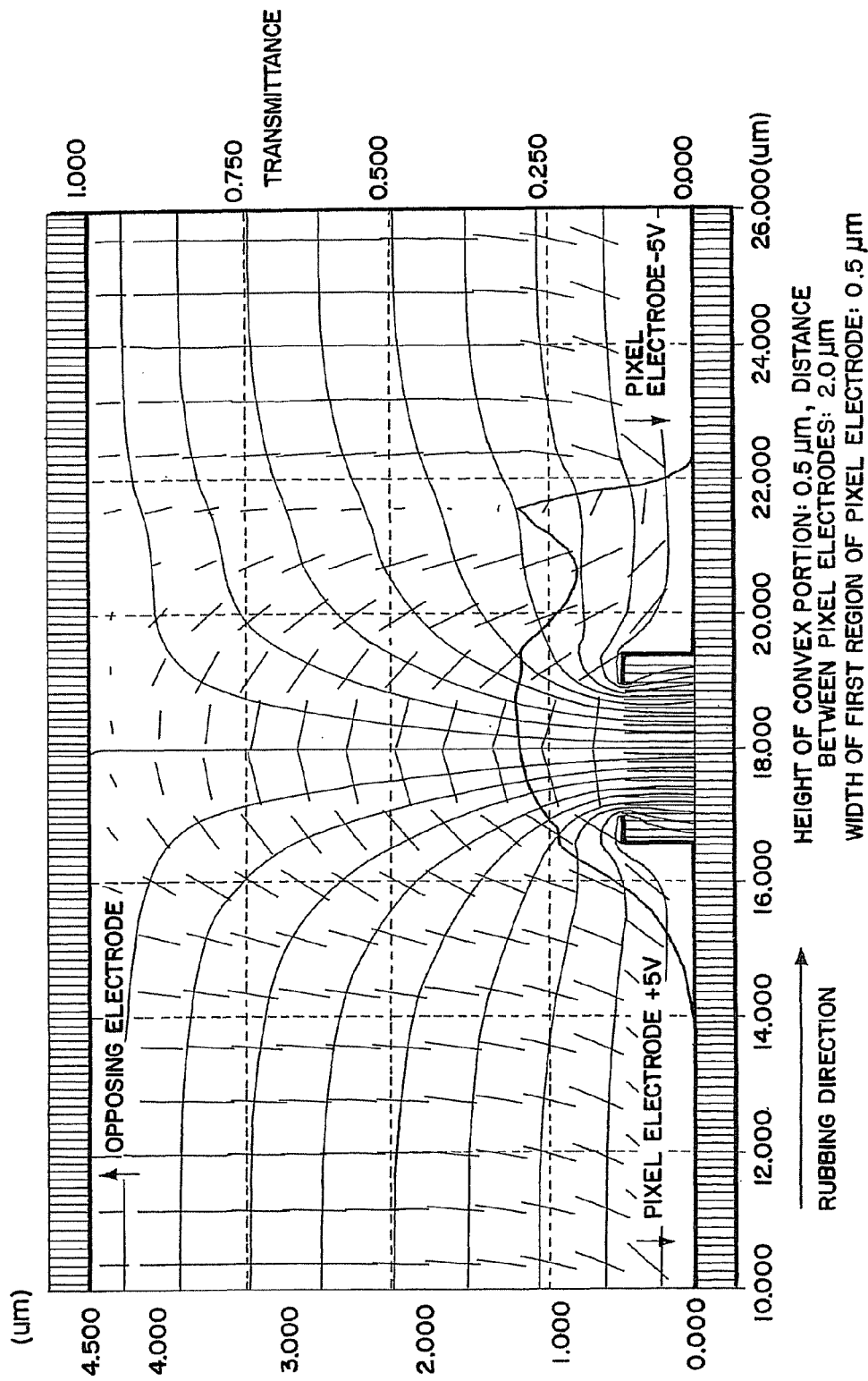
FIG. 14 is a cross sectional diagram showing simulation results when there is a pixel electrode in a side portion and an upper edge portion.
Figure 16A:
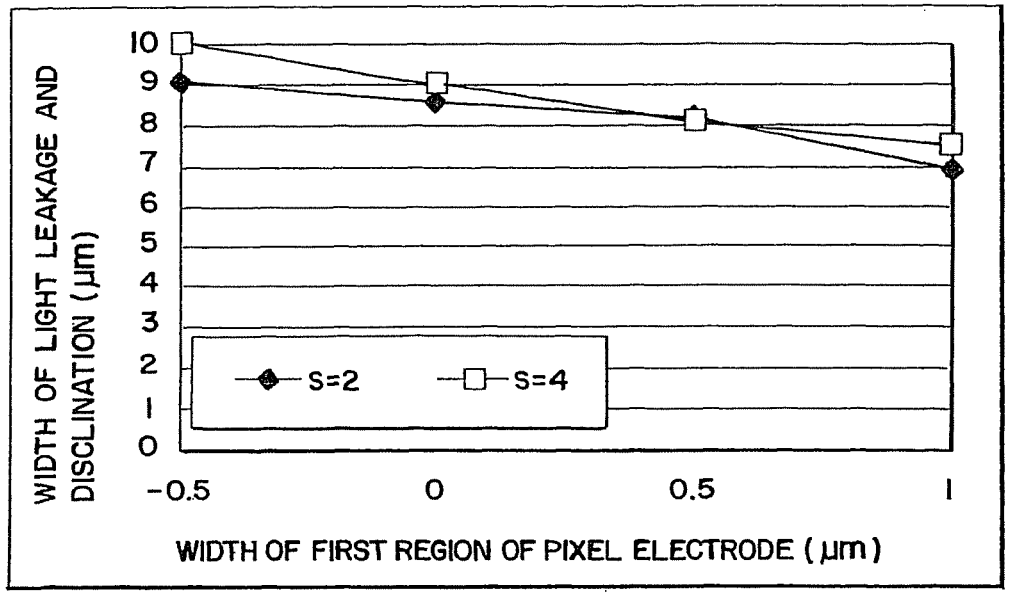
FIGS. 16A and 16B are diagrams showing the relationship between the width of a first region of a pixel electrode and a disclination width.
Figure 16B:
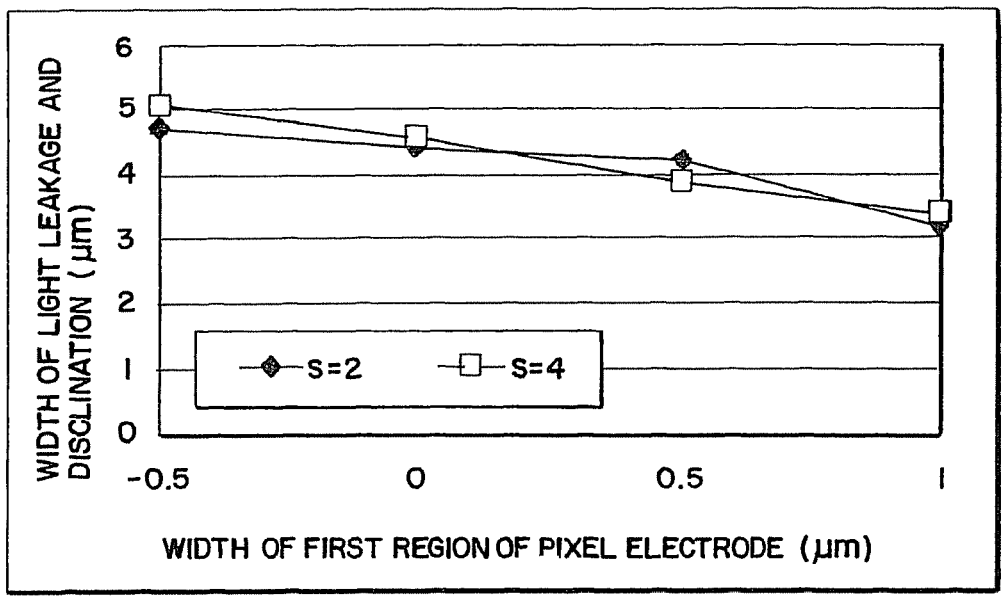
Figure 36:
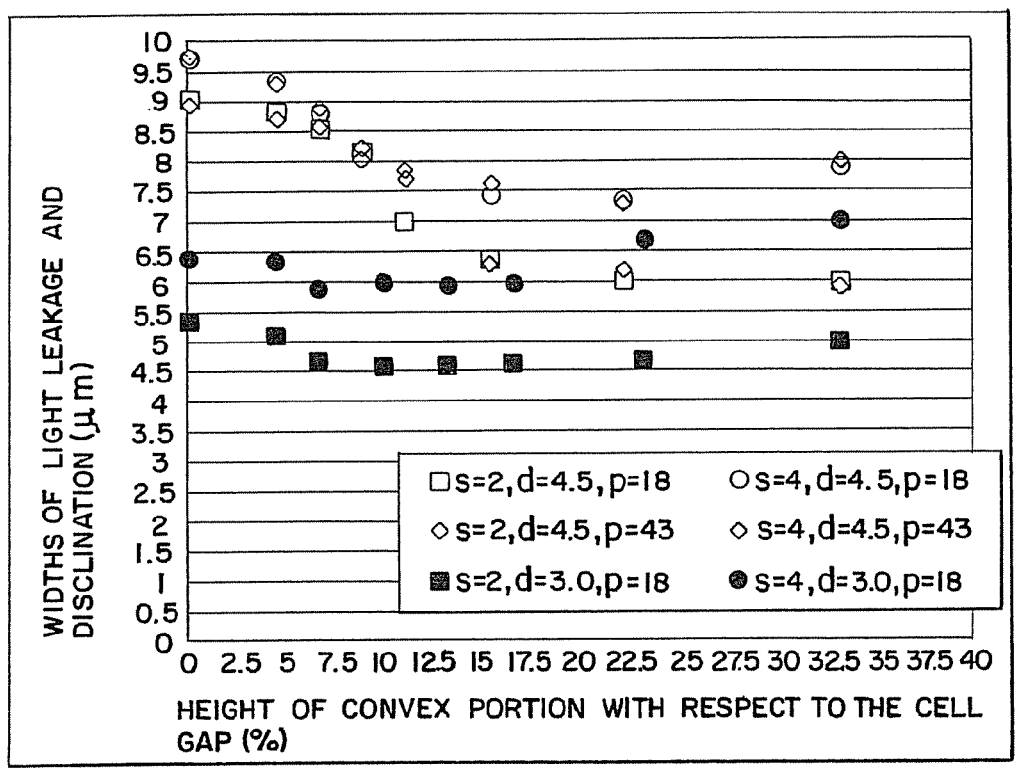
FIG. 36 is a diagram showing the relationship between: the height of a convex portion with respect to a cell gap; and the amount of light leakage and the width of disclination.
Figure 37A:
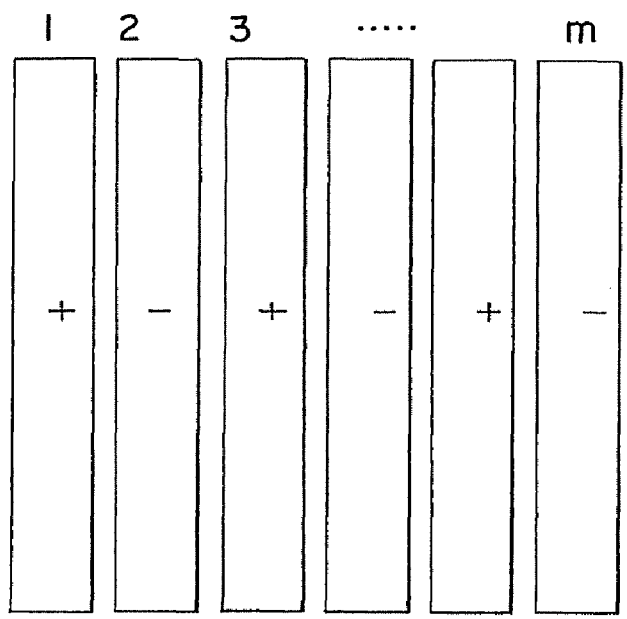
FIGS. 37A and 37B are diagrams showing the polarity of a voltage applied to a pixel when performing source line inversion drive.
Figure 37B:
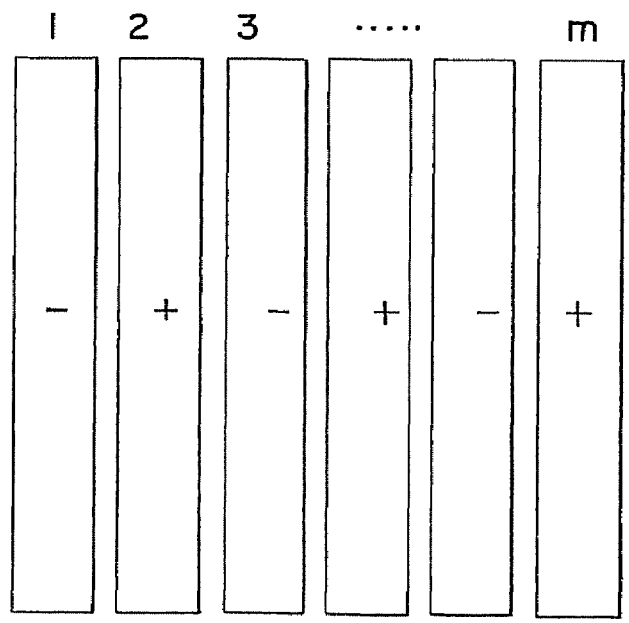

In this embodiment, the edge of pixel electrode 491 is formed overlapping with a convex portion 600 which have 0.32 μm height. The height of the convex portion becomes 8% of the cell gap because the height of the cell gap is 4.0 μm. It is understood that the height of the convex portion has an effect to decrease disclination and light leakage by a graphic chart of FIG. 9 and FIG. 36.

Embodiment 4

The liquid crystal display device formed by implementing an embodiment among above-mentioned Embodiments 1 to 3 can be applied to various electro-optical equipments. Thus the present invention can be applied to all of the electronic equipments having these electro-optical devices as the display portion.

The following can be given as examples of the electronic equipment: video cameras; digital cameras; projectors; head mounted displays (goggle type display); car navigation systems; car stereo; personal computers; portable information terminals (such as mobile computers, portable telephones and electronic notebook). An example of these is shown in FIGS. 30, 31 and 32.

Figure 30A:
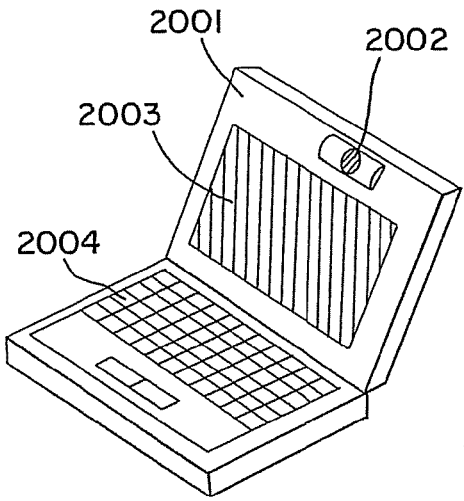
FIGS. 30A to 30F are diagrams showing examples of electronic devices (Embodiment 4)

FIG. 30A shows a personal computer, and it includes a main body 2001, an image input section 2002, a display portion 2003, and a keyboard 2004. The present invention is applicable to the display portion 2003.

Figure 30B:
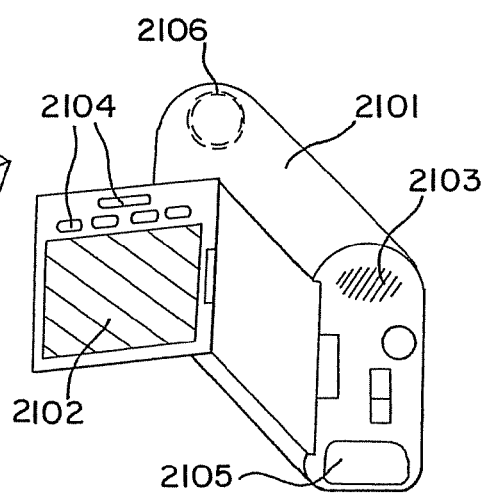

FIG. 30B shows a video camera, and it includes a main body 2101, a display portion 2102, a voice input section 2103, operation switches 2104, a battery 2105, and an image receiving section 2106. The present invention is applicable to the display portion 2102.

Figure 30C:
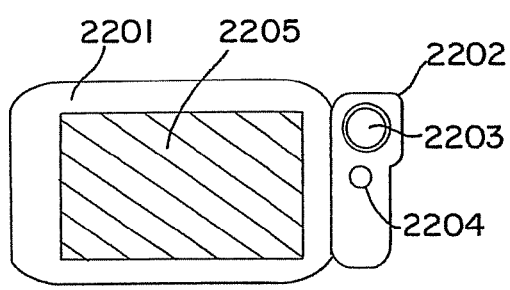

FIG. 30C shows a mobile computer, and it includes a main body 2201, a camera section 2202, an image receiving section 2203, operation switches 2204, and a display portion 2205. The present invention is applicable to the display portion 2205.

Figure 30D:
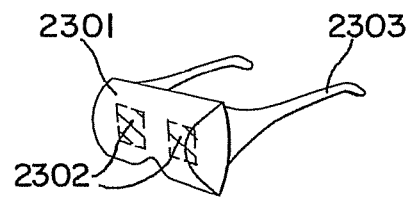

FIG. 30D shows a goggle type display, and it includes a main body 2301; a display portion 2302; and an arm section 2303. The present invention is applicable to the display portion 2302.

Figure 30E:
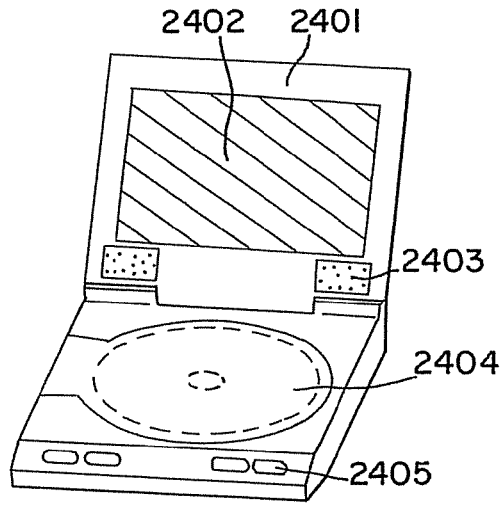

FIG. 30E shows a player using a recording medium which records a program (hereinafter referred to as a recording medium), and it includes a main body 2401; a display portion 2402; a speaker section 2403; a recording medium 2404; and operation switches 2405. This player uses DVD (digital versatile disc), CD, etc. for the recording medium, and can be used for music appreciation, film appreciation, games and Internet. The present invention is applicable to the display portion 2402.

Figure 30F:
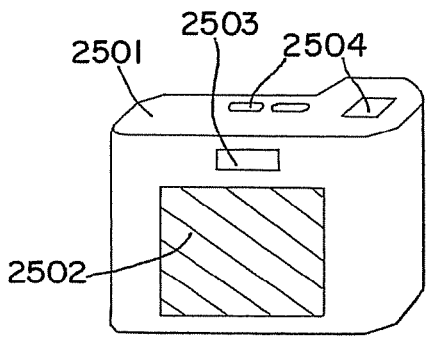

FIG. 30F shows a digital camera, and it includes a main body 2501; a display portion 2502; a view finder 2503; operation switches 2504; and an image receiving section (not shown in the figure). The present invention can be applied to the display portion 2502.

Figure 31A:
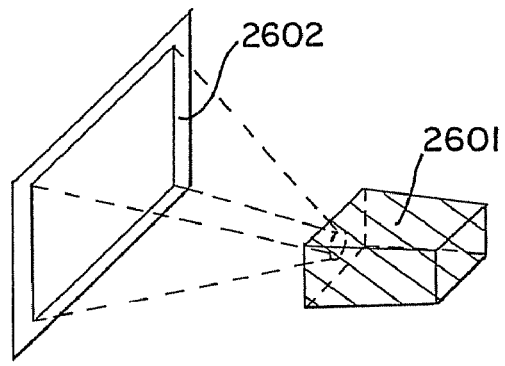
FIGS. 31A to 31D are diagrams showing examples of electronic devices (Embodiment 4)

FIG. 31A is a front-type projector, and it includes a projection device 2601 and a screen 2602. The present invention is applicable to a liquid crystal display device 2808 which comprises one of the projection device 2601.

Figure 31B:
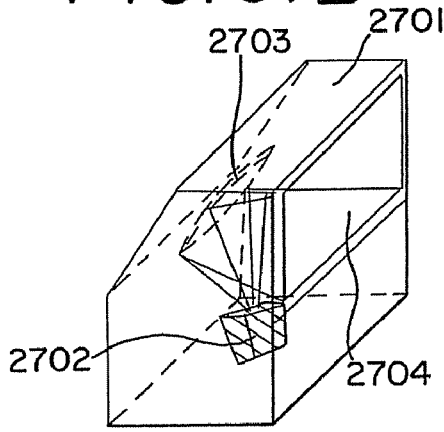

FIG. 31B is a rear-type projector, and it includes a main body 2701, a projection device 2702, a mirror 2703, and a screen 2704. The present invention is applicable to a liquid crystal display device 2808 which comprises one of the projection device 2702.

Figure 31C:
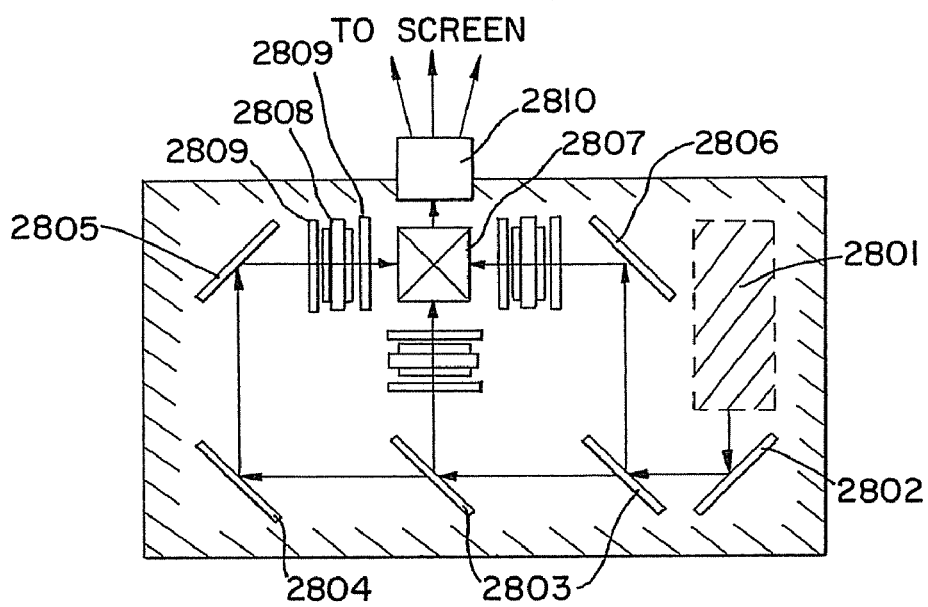

FIG. 31C is a diagram showing an example of the structure of the projection devices 2601, 2702 in FIGS. 31A and 31B. The projection device 2601 or 2702 comprises a light source optical system 2801, mirrors 2802, 2804 to 2806, dichroic mirrors 2803, a prism 2807, liquid crystal display devices 2808, phase difference plates 2809, and a projection optical system 2810. The projection optical system 2810 is composed of an optical system including a projection lens. This example shows an example of three-plate type but not particularly limited thereto. For instance, the invention may be applied also to a single plate type optical system. Further, in the light path indicated by an arrow in FIG. 31C, an optical system such as an optical lens, a film having a polarization function, a film for adjusting a phase difference, and an IR film may be suitably provided by a person who carries out the invention.

Figure 31D:
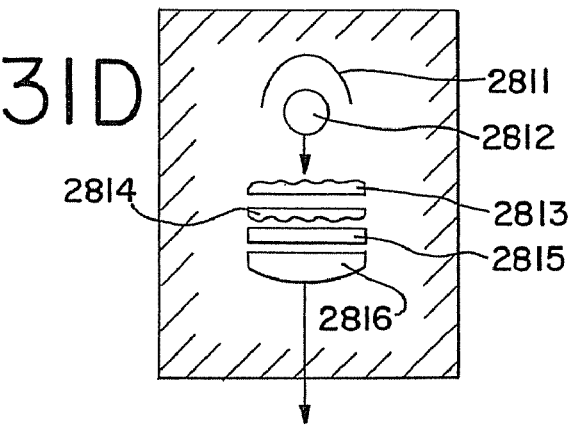

FIG. 31D is a diagram showing an example of the structure of the light source optical system 2801 in FIG. 31C. In this embodiment, the light source optical system 2801 comprises a reflector 2811, a light source 2812, lens arrays 2813, 2814, a polarization conversion element 2815, and a condenser lens 2816. The light source optical system shown in FIG. 31D is merely an example, and is not particularly limited to the illustrated structure. For example, a person who carries out the invention is allowed to suitably add to the light source optical system an optical system such as an optical lens, a film having a polarization function, a film for adjusting a phase difference, and an IR film.

Note that a transmission electro-optical device is used as the projector shown in FIG. 31, a reflection type electro-optical device is not illustrated.

Figure 32A:
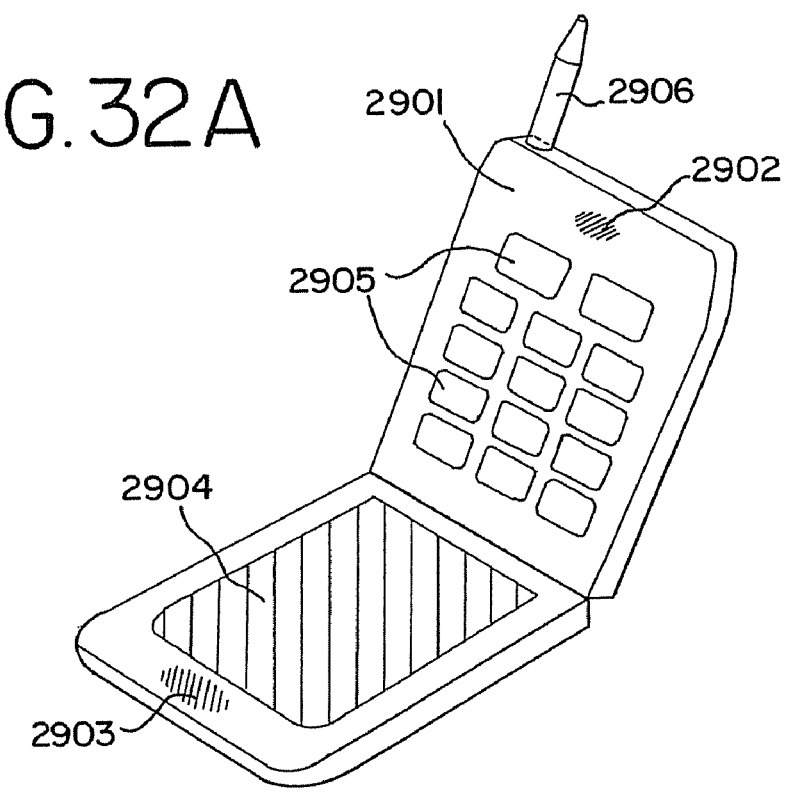
FIGS. 32A to 32C are diagrams showing examples of electronic devices (Embodiment 4)

FIG. 32A is a portable telephone, and it includes a main body 2901, an audio output section 2902, an audio input section 2903, a display portion 2904, operation switches 2905, and an antenna 2906. The present invention can be applied to the display portion 2904.

Figure 32B:
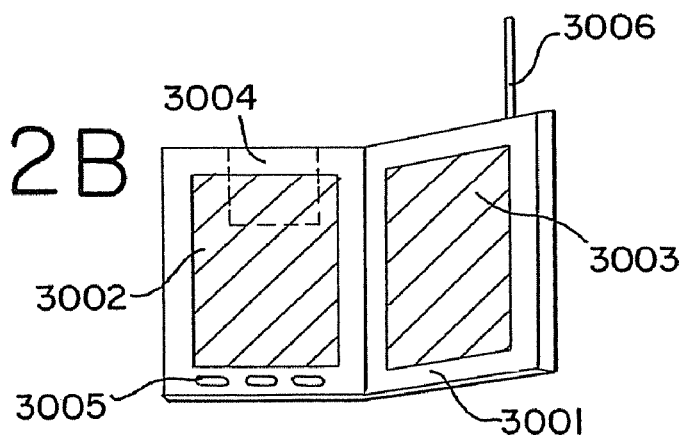

FIG. 32B is a portable book (electronic book), and it includes a main body 3001, display portions 3002 and 3003, a recording medium 3004, operation switches 3005, and an antenna 3006. The present invention can be applied to the display portions 3002 and 3003.

Figure 32C:
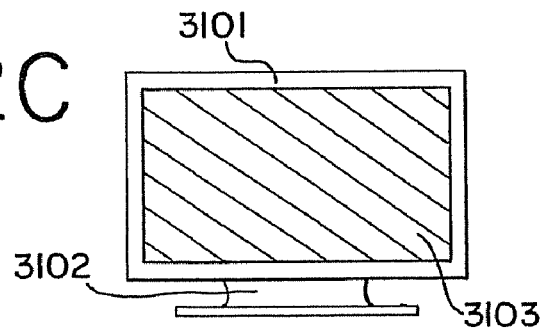
Figure 33A:
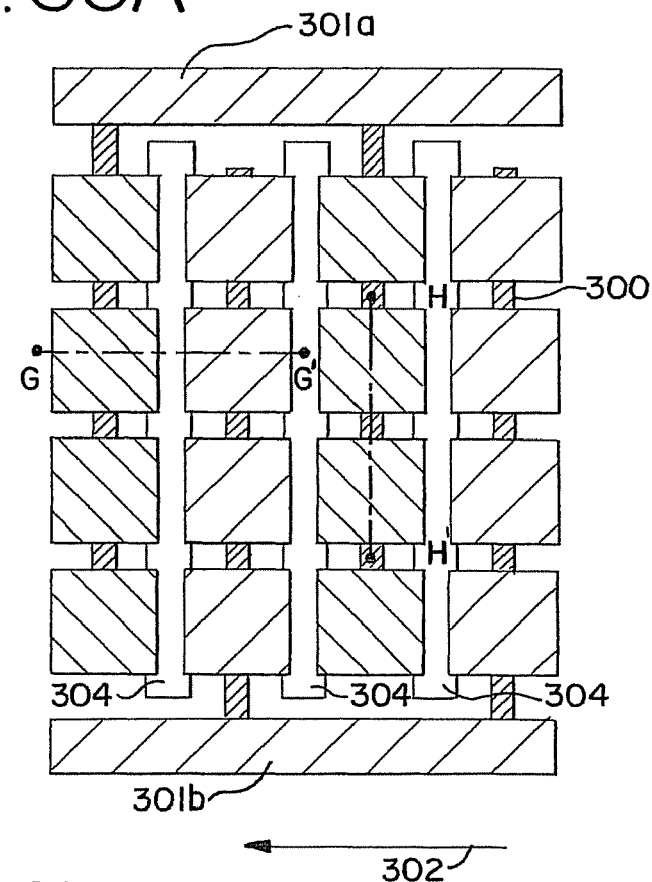
FIGS. 33A to 33C are diagrams showing an electrode and a convex portion of an experimental substrate.
Figure 33B:
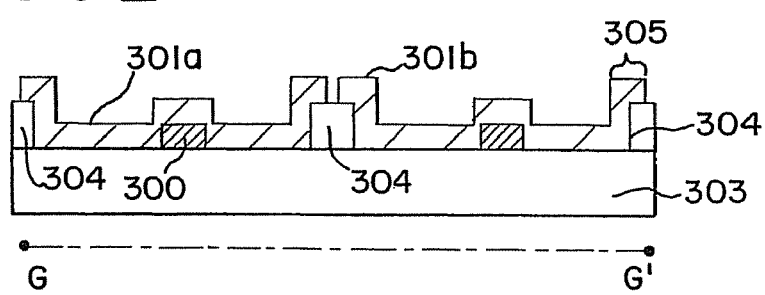
Figure 33C:
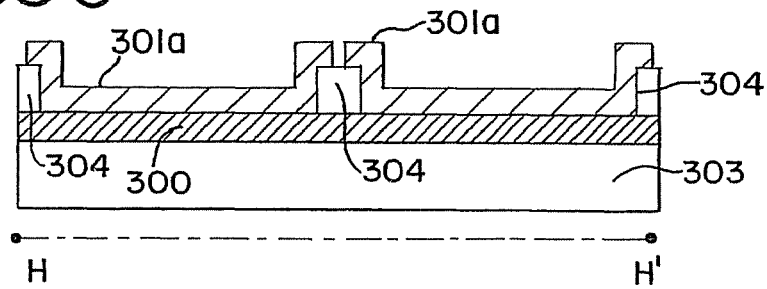
Figure 34A:
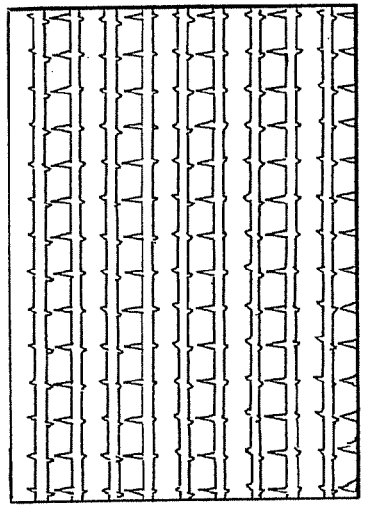
FIGS. 34A to 34D are diagrams showing the change in liquid crystal orientation due to a first width of a pixel electrode.
Figure 34B:
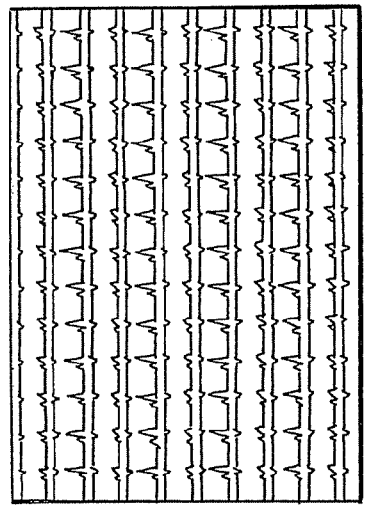
Figure 34C:
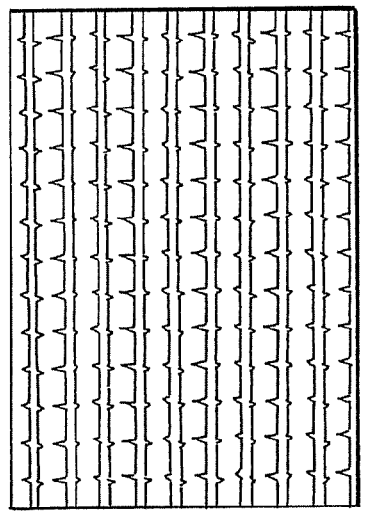
Figure 34D:
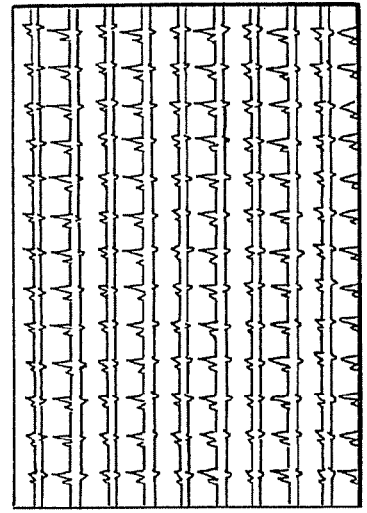
Figure 35:
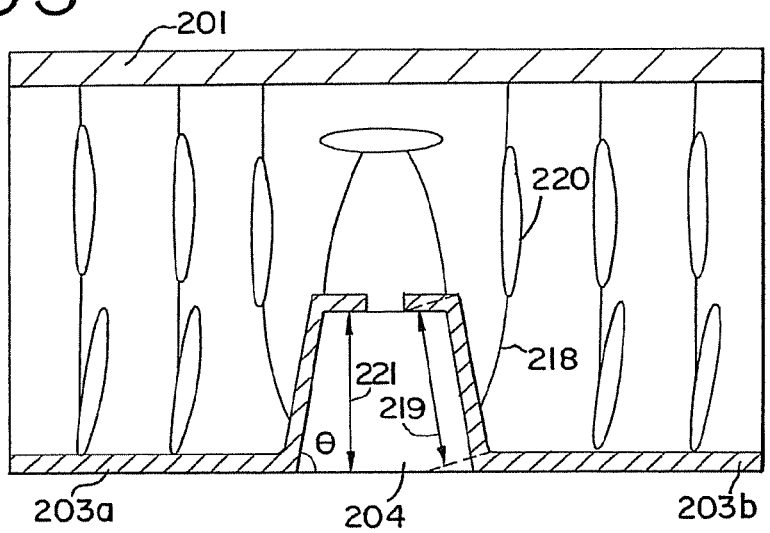
FIG. 35 is a cross sectional diagram showing an electric power supply line when a convex portion has a taper.

FIG. 32C is a display, and it includes a main body 3101, a support stand 3102, and a display portion 3103. The present invention can be applied to the display portion 3103. The display of the present invention is advantageous for a large size screen in particular, and is advantageous for a display equal to or greater than 10 inches (especially equal to or greater than 30 inches) in diagonal.

The applicable range of the present invention is thus extremely wide, and it is possible to apply the present invention to electronic equipment in all fields. Further, the electronic equipment of Embodiment 4 can be realized by using a constitution of any combination of Embodiments 1 to 3.

Orientation irregularities of liquid crystals, in which there is disclination and light leakage of a liquid crystal display device when displaying a black level, can thus be reduced in accordance with the present invention, and a liquid crystal display device having high contrast and good visibility can be provided.

What is claimed is:
1. A liquid crystal display device comprising:
a thin film transistor over a substrate;
a gate wiring comprising a conductive material, and a pattern comprising the conductive material and a source wiring over the substrate;
a source wiring over the gate wiring and the pattern;
a convex portion over the substrate, and formed comprising a first portion in parallel with the gate wiring, and a second portion in parallel with the source wiring; and
a pixel electrode electrically connected to the thin film transistor, and partially overlapped with the convex portion;
wherein an edge of the pixel electrode and the second portion are overlapped with each other,
wherein the first portion intersects with the source wiring, and
wherein the convex portion comprises the pattern.
2. A liquid crystal display device comprising:
a pixel portion over a substrate, and comprising:
a first thin film transistor over the substrate;
a gate wiring comprising a conductive material, and a pattern comprising the conductive material and a source wiring over the substrate;
a source wiring over the gate wiring and the pattern;
a convex portion over the substrate, and formed comprising a first portion in parallel with the gate wiring, and a second portion in parallel with the source wiring; and a pixel electrode electrically connected to the first thin film transistor, and partially overlapped with the convex portion;

a driver circuit over the substrate, and comprising a second thin film transistor, wherein an edge of the pixel electrode and the second portion are overlapped with each other, wherein the first portion intersects with the source wiring, and wherein the convex portion comprises the pattern.

3. A liquid crystal display device comprising:

a thin film transistor over a substrate;

a gate wiring comprising a conductive material, and a pattern comprising the conductive material and a source wiring over the substrate;

a source wiring over the gate wiring and the pattern;

a convex portion over the substrate, and formed comprising a first portion in parallel with the gate wiring, and a second portion in parallel with the source wiring; and an insulating film over the thin film transistor;

a pixel electrode over the insulating film, electrically connected to the thin film transistor, and partially overlapped with the convex portion;

wherein an edge of the pixel electrode and the second portion are overlapped with each other, wherein the first portion intersects with the source wiring, and wherein the convex portion comprises the pattern.

4. A liquid crystal display device according to claim 1, wherein the convex portion is provided over an insulating film.

5. A liquid crystal display device according to claim 2, wherein the convex portion is provided over an insulating film.

6. A liquid crystal display device according to claim 3, wherein the convex portion is provided over the insulating film.

7. A liquid crystal display device according to claim 1, further comprising a storage capacitor over the substrate, and comprising a first electrode comprising a semiconductor film of the thin film transistor, a second electrode comprising a gate electrode of the thin film transistor, and an dielectric film comprising a gate insulating film of the thin film transistor.

8. A liquid crystal display device according to claim 2, further comprising a storage capacitor over the substrate, and comprising a first electrode comprising a semiconductor film of the thin film transistor, a second electrode comprising a gate electrode of the thin film transistor, and an dielectric film comprising a gate insulating film of the thin film transistor.

9. A liquid crystal display device according to claim 3, further comprising a storage capacitor over the substrate, and comprising a first electrode comprising a semiconductor film of the thin film transistor, a second electrode comprising a gate electrode of the thin film transistor, and an dielectric film comprising a gate insulating film of the thin film transistor.

10. A liquid crystal display device according to claim 1, wherein the convex portion comprises a film selected from the group consisting of a photosensitive organic resin film, an organic resin film, a silicon oxide film, a silicon nitride film and a silicon oxynitride film.

11. A liquid crystal display device according to claim 2, wherein the convex portion comprises a film selected from the group consisting of a photosensitive organic resin film, an organic resin film, a silicon oxide film, a silicon nitride film and a silicon oxynitride film.

12. A liquid crystal display device according to claim 3, wherein the convex portion comprises a film selected from the group consisting of a photosensitive organic resin film, an organic resin film, a silicon oxide film, a silicon nitride film and a silicon oxynitride film.

13. A liquid crystal display device according to claim 1, wherein a taper angle of the convex portion is less than 90°.

14. A liquid crystal display device according to claim 2, wherein a taper angle of the convex portion is less than 90°.

15. A liquid crystal display device according to claim 3, wherein a taper angle of the convex portion is less than 90°.

16. A liquid crystal display device according to claim 1, wherein the liquid crystal display device is a reflective type liquid crystal display device.

17. A liquid crystal display device according to claim 2, wherein the liquid crystal display device is a reflective type liquid crystal display device.

18. A liquid crystal display device according to claim 3, wherein the liquid crystal display device is a reflective type liquid crystal display device.

19. A liquid crystal display device according to claim 1, wherein the liquid crystal display device is a transmission type liquid crystal display device.

20. A liquid crystal display device according to claim 2, wherein the liquid crystal display device is a transmission type liquid crystal display device.

21. A liquid crystal display device according to claim 3, wherein the liquid crystal display device is a transmission type liquid crystal display device.

22. A liquid crystal display device according to claim 1, wherein the liquid crystal display device is applied to an electronic equipment selected from the group consisting of a video camera, a digital camera, a projector, a head mounted display, a mobile computer, a portable telephone and an electronic notebook.

23. A liquid crystal display device according to claim 2, wherein the liquid crystal display device is applied to an electronic equipment selected from the group consisting of a video camera, a digital camera, a projector, a head mounted display, a mobile computer, a portable telephone and an electronic notebook.

24. A liquid crystal display device according to claim 3, wherein the liquid crystal display device is applied to an electronic equipment selected from the group consisting of a video camera, a digital camera, a projector, a head mounted display, a mobile computer, a portable telephone and an electronic notebook.

* * * * *

UNITED STATES PATENT AND TRADEMARK OFFICE
CERTIFICATE OF CORRECTION

| | | |
|---|---|---|
| PATENT NO. | : 8,102,480 B2 | Page 1 of 1 |
| APPLICATION NO. | : 12/604949 | |
| DATED | : January 24, 2012 | |
| INVENTOR(S) | : Yoshiharu Hirakata, Yuriko Hamamoto and Rumo Satake | |

It is certified that error appears in the above-identified patent and that said Letters Patent is hereby corrected as shown below:

In the Specification:

Column 9, Line 25; Change "taper angle 0" to -- taper angle $\theta$ --.

Column 10, Line 9; Change "a –5 B" to -- a –5 V--.

Column 11, Line 8; Change "correct" to -- connect --.

In the Claims:

Claim 1, Column 24, Lines 44-45; Remove "and a source wiring".

Claim 1, Column 24, Line 47; Remove "formed".

Claim 2, Column 24, Lines 62-63; Remove "and a source wiring".

Claim 2, Column 24, Line 65; Remove "formed".

Claim 3, Column 25, Lines 14-15; Remove "and a source wiring".

Signed and Sealed this
Tenth Day of July, 2012

David J. Kappos
*Director of the United States Patent and Trademark Office*